United States Patent
Leung et al.

(10) Patent No.: US 8,797,850 B2
(45) Date of Patent: Aug. 5, 2014

(54) SYSTEM AND METHOD TO ADAPT TO NETWORK CONGESTION

(75) Inventors: Nikolai Konrad Nepomuceno Leung, San Diego, CA (US); Christopher Gerard Lott, San Diego, CA (US); Chandrasekhar Therazhandur Sundarraman, San Diego, CA (US); Peerapol Tinnakornsrisuphap, San Diego, CA (US); Serafin Diaz Spindola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 12/331,234

(22) Filed: Dec. 9, 2008

(65) Prior Publication Data

US 2009/0180379 A1 Jul. 16, 2009

Related U.S. Application Data

(60) Provisional application No. 61/020,368, filed on Jan. 10, 2008.

(51) Int. Cl.
*H04L 12/26* (2006.01)
*H04L 12/56* (2006.01)
*H04L 12/54* (2006.01)

(52) U.S. Cl.
USPC ............................ 370/229; 370/412; 370/428

(58) Field of Classification Search
USPC .............. 370/229, 235, 235.1, 236, 237, 412, 370/428, 429
See application file for complete search history.

(56) References Cited

U.S. PATENT DOCUMENTS

| 4,774,587 A | 9/1988 | Schmitt |
| 5,341,374 A | 8/1994 | Lewen et al. |
| 5,367,523 A | 11/1994 | Chang et al. |
| 5,541,919 A | 7/1996 | Yong et al. |
| 5,550,589 A | 8/1996 | Shiojiri et al. |

(Continued)

FOREIGN PATENT DOCUMENTS

| CN | 1272271 | 11/2000 |
| CN | 1273011 | 11/2000 |

(Continued)

OTHER PUBLICATIONS

3GPP TR 26.902 V1.0.0, "3RD Generation Partnership Project; Technical Specification Group Services and System Aspects; Video Codec Performance," (Release 7)(Mar. 2007).

(Continued)

*Primary Examiner* — Warner Wong
(74) *Attorney, Agent, or Firm* — Todd E. Marlette

(57) ABSTRACT

In a particular embodiment, a method is disclosed that includes receiving a feedback message at a transmitter, the feedback message including an indication of a magnitude of congestion and a sustainable rate of data transmission at a receiver. The method also includes determining a decongestion rate and a decongestion time based on at least one of the sustainable rate of data transmission and the magnitude of congestion when the magnitude of congestion satisfies a threshold value. The method further includes sending data at the decongestion rate from the transmitter to the receiver for the decongestion time. The method also includes adjusting a data transmission rate at the transmitter to the sustainable rate of data transmission after the decongestion time is ended.

29 Claims, 10 Drawing Sheets

(56) References Cited

U.S. PATENT DOCUMENTS

| | | |
|---|---|---|
| 5,550,593 A | 8/1996 | Nakabayashi |
| 5,621,840 A | 4/1997 | Kawamura et al. |
| 5,768,533 A | 6/1998 | Ran |
| 5,790,538 A | 8/1998 | Sugar |
| 5,802,068 A | 9/1998 | Kudo |
| 5,838,678 A | 11/1998 | Davis et al. |
| 5,969,764 A | 10/1999 | Sun et al. |
| 6,002,802 A | 12/1999 | Chujoh et al. |
| 6,111,917 A | 8/2000 | Tomita et al. |
| 6,154,489 A | 11/2000 | Kleider et al. |
| 6,233,251 B1 | 5/2001 | Kurobe et al. |
| 6,330,683 B1 | 12/2001 | Jeddeloh |
| 6,389,034 B1 | 5/2002 | Guo et al. |
| 6,396,956 B1 | 5/2002 | Ribas-Corbera et al. |
| 6,404,776 B1 | 6/2002 | Voois et al. |
| 6,421,387 B1 | 7/2002 | Rhee |
| 6,487,316 B1 | 11/2002 | Fukunaga et al. |
| 6,490,243 B1 | 12/2002 | Tanaka et al. |
| 6,574,247 B1 | 6/2003 | Baggen |
| 6,587,437 B1 | 7/2003 | Lee et al. |
| 6,629,318 B1 | 9/2003 | Radha et al. |
| 6,633,609 B1 | 10/2003 | Ing et al. |
| 6,694,469 B1 | 2/2004 | Jalali et al. |
| 6,747,991 B1 | 6/2004 | Hemy et al. |
| 6,862,298 B1 * | 3/2005 | Smith et al. ............ 370/516 |
| 6,865,374 B2 | 3/2005 | Kalluri |
| 6,891,822 B1 | 5/2005 | Gubbi et al. |
| 7,020,484 B2 | 3/2006 | Gholmieh et al. |
| 7,023,915 B2 | 4/2006 | Pian et al. |
| 7,051,358 B2 | 5/2006 | Hakenberg et al. |
| 7,058,085 B2 | 6/2006 | Earnshaw et al. |
| 7,068,086 B2 | 6/2006 | Takeda |
| 7,092,355 B1 * | 8/2006 | Duong-Van ............ 370/230 |
| 7,193,966 B2 | 3/2007 | Gupta et al. |
| 7,197,026 B2 | 3/2007 | Chen et al. |
| 7,206,285 B2 * | 4/2007 | Loguinov ............... 370/235 |
| 7,242,668 B2 * | 7/2007 | Kan et al. .............. 370/234 |
| 7,269,139 B1 * | 9/2007 | Williams et al. ....... 370/235 |
| 7,304,951 B2 | 12/2007 | Rhee |
| 7,342,880 B2 | 3/2008 | Yanagihara et al. |
| 7,342,901 B1 | 3/2008 | Zhang et al. |
| 7,356,079 B2 | 4/2008 | Laksono et al. |
| 7,359,324 B1 * | 4/2008 | Ouellette et al. ....... 370/230 |
| 7,369,497 B2 | 5/2008 | Naruse |
| 7,369,517 B2 | 5/2008 | Dillinger et al. |
| 7,433,408 B2 | 10/2008 | Hatano et al. |
| 7,453,938 B2 | 11/2008 | Haskell et al. |
| 7,483,378 B2 * | 1/2009 | Chikamatsu ........... 370/235.1 |
| 7,492,710 B2 * | 2/2009 | Wadekar et al. ....... 370/230 |
| 7,533,192 B2 | 5/2009 | Otsuka et al. |
| 7,606,427 B2 | 10/2009 | Malayath et al. |
| 7,668,096 B2 * | 2/2010 | Ignatowski et al. .... 370/232 |
| 7,944,838 B2 * | 5/2011 | Nakamura et al. ..... 370/235.1 |
| 8,437,255 B2 * | 5/2013 | Jiang ..................... 370/232 |
| 8,514,711 B2 | 8/2013 | Lee et al. |
| 2002/0007416 A1 | 1/2002 | Putzolu |
| 2002/0031336 A1 | 3/2002 | Okada et al. |
| 2002/0054578 A1 | 5/2002 | Zhang et al. |
| 2002/0154640 A1 * | 10/2002 | Wei ....................... 370/401 |
| 2002/0191544 A1 | 12/2002 | Cheng et al. |
| 2003/0026277 A1 * | 2/2003 | Pate et al. .............. 370/412 |
| 2003/0202528 A1 * | 10/2003 | Eckberg ................. 370/412 |
| 2004/0076118 A1 | 4/2004 | Ho et al. |
| 2004/0252761 A1 | 12/2004 | Brown et al. |
| 2005/0013244 A1 | 1/2005 | Parlos |
| 2005/0013245 A1 * | 1/2005 | Sreemanthula et al. ...... 370/229 |
| 2005/0117056 A1 | 6/2005 | Aprea et al. |
| 2005/0152320 A1 | 7/2005 | Marinier et al. |
| 2005/0207392 A1 | 9/2005 | Sivalingham et al. |
| 2005/0207437 A1 * | 9/2005 | Spitzer ................... 370/412 |
| 2005/0210515 A1 | 9/2005 | Roh et al. |
| 2005/0220116 A1 | 10/2005 | Ahn et al. |
| 2005/0243846 A1 * | 11/2005 | Mallila .................. 370/412 |
| 2005/0249231 A1 | 11/2005 | Khan |
| 2005/0254508 A1 * | 11/2005 | Aksu et al. ............. 370/428 |
| 2005/0259694 A1 | 11/2005 | Garudadri et al. |
| 2005/0283809 A1 | 12/2005 | Kim |
| 2006/0007958 A1 | 1/2006 | Kang et al. |
| 2006/0013263 A1 | 1/2006 | Fellman |
| 2006/0050743 A1 | 3/2006 | Black et al. |
| 2006/0072832 A1 | 4/2006 | Nemiroff et al. |
| 2006/0083243 A1 * | 4/2006 | Igarashi et al. ............... 370/392 |
| 2006/0256756 A1 | 11/2006 | Wakabayashi |
| 2007/0019931 A1 | 1/2007 | Sirbu |
| 2007/0041324 A1 * | 2/2007 | Shenoi ................... 370/235 |
| 2007/0071030 A1 | 3/2007 | Lee |
| 2007/0091815 A1 | 4/2007 | Tinnakornsrisuphap et al. |
| 2007/0091816 A1 | 4/2007 | Lee et al. |
| 2007/0097257 A1 | 5/2007 | El-Maleh et al. |
| 2007/0121706 A1 | 5/2007 | Nakamura et al. |
| 2007/0201406 A1 | 8/2007 | Yoon et al. |
| 2007/0291870 A1 | 12/2007 | Ponnekanti |
| 2008/0056125 A1 * | 3/2008 | Kneckt et al. ................. 370/229 |
| 2008/0170500 A1 | 7/2008 | Ito et al. |
| 2008/0205856 A1 | 8/2008 | Kim et al. |
| 2009/0021572 A1 | 1/2009 | Garudadri et al. |
| 2009/0028050 A1 * | 1/2009 | Winter ................... 370/236 |
| 2009/0034610 A1 | 2/2009 | Lee et al. |
| 2009/0046743 A1 * | 2/2009 | Hamanaka .............. 370/498 |
| 2010/0215053 A1 * | 8/2010 | Chakareski et al. ........... 370/465 |

FOREIGN PATENT DOCUMENTS

| | | |
|---|---|---|
| CN | 1293871 | 5/2001 |
| CN | 1674676 A | 9/2005 |
| EP | 1014739 | 6/2000 |
| EP | 1168732 A1 | 1/2002 |
| EP | 1170957 A2 | 1/2002 |
| EP | 1261163 A2 | 11/2002 |
| EP | 1372304 A2 | 12/2003 |
| EP | 1478137 A1 | 11/2004 |
| EP | 1482681 A1 | 12/2004 |
| EP | 1575225 A2 | 9/2005 |
| EP | 1628446 A1 | 2/2006 |
| EP | 1641147 A1 | 3/2006 |
| JP | 9130787 | 5/1997 |
| JP | 9214507 A | 8/1997 |
| JP | 10164533 A | 6/1998 |
| JP | 10303932 A | 11/1998 |
| JP | 10322673 A | 12/1998 |
| JP | 10341217 A | 12/1998 |
| JP | 11069349 A | 3/1999 |
| JP | 2000324171 A | 11/2000 |
| JP | 2001230809 | 8/2001 |
| JP | 2001238256 A | 8/2001 |
| JP | 2001517049 A | 10/2001 |
| JP | 2002016929 A | 1/2002 |
| JP | 2002354141 A | 12/2002 |
| JP | 2003209537 A | 7/2003 |
| JP | 2003244695 | 8/2003 |
| JP | 2004015761 A | 1/2004 |
| JP | 2004072720 A | 3/2004 |
| JP | 2004208001 A | 7/2004 |
| JP | 2004253883 | 9/2004 |
| JP | 2004528769 A | 9/2004 |
| JP | 2004297186 A | 10/2004 |
| JP | 2004350227 A | 12/2004 |
| JP | 2004364277 A | 12/2004 |
| JP | 2004537203 A | 12/2004 |
| JP | 2005057323 A | 3/2005 |
| JP | 2005086304 A | 3/2005 |
| JP | 2005192073 A | 7/2005 |
| JP | 2005236783 A | 9/2005 |
| JP | 2005244908 A | 9/2005 |
| JP | 2005286832 A | 10/2005 |
| JP | 2005303925 A | 10/2005 |
| JP | 2006511124 A | 3/2006 |
| JP | 2006222822 A | 8/2006 |
| KR | 20020081521 A | 10/2002 |
| KR | 1020060046281 | 5/2006 |
| RU | 2161873 C2 | 1/2001 |
| RU | 2219671 | 12/2003 |
| RU | 2219682 C2 | 12/2003 |
| RU | 2295833 C2 | 3/2007 |

(56) References Cited

FOREIGN PATENT DOCUMENTS

| | | |
|---|---|---|
| RU | 2002130511 | 3/2007 |
| WO | WO9823109 A2 | 5/1998 |
| WO | WO9914975 | 3/1999 |
| WO | WO0018130 A1 | 3/2000 |
| WO | WO0180477 | 10/2001 |
| WO | WO03001725 A1 | 1/2003 |
| WO | WO03026316 | 3/2003 |
| WO | WO03077462 A1 | 9/2003 |
| WO | WO2004056028 A1 | 7/2004 |
| WO | WO2004056123 | 7/2004 |
| WO | WO2004084503 A2 | 9/2004 |
| WO | WO2004091130 A1 | 10/2004 |
| WO | WO2005004374 A2 | 1/2005 |
| WO | WO2005039209 A1 | 4/2005 |
| WO | WO2005122025 A2 | 12/2005 |
| WO | WO2007051156 | 5/2007 |
| WO | WO2007119086 | 10/2007 |
| WO | WO2008024890 A2 | 2/2008 |

OTHER PUBLICATIONS

3GPP TR 26.914, "Multimedia telphony over IP Multimedia Subsystem (IMS); Optimization opportunities" 2006.
3GPP TS 26.114 v1.2.0 (Dec. 13, 2006), "3rd Generation Partnership Project; Technical Specification Group Services and System Aspects—IP multimedia subsystem (IMS) multimedia telephony; media handling and interaction," (Release 7) TSG-SA4 internal working draft.
3GPP TS 34.108 v6.5.0, "3rd Generation Partnership Project; Technical Specification Group Radio Access Network Common test environment for UE conformance testing," (Release 6) (Dec. 2006).
3GPP2 C.R1008 v1.0, "cdma2000 Multimedia evaluation methodologies," Jan. 12, 2007.
3GPP2: "Packet Switched Video Telephony Services (PSVT/MCS)" 3GPP2, C.S0055-0, Version 1.0, Dec. 2007, XP002542622 p. 32, paragraph 8-p. 33.
CDMA2000 High Rate Packet Data Air Interface Specification 3GGP2 CS0024-A V10, [Online] (Mar. 1, 2004), p. 13-46 XP000863923.
D. Morikawa et al.: A feedback rate control of video stream in best-effort high-speed mobile packet network, The 5th Int. Symp. Wireless Personal Multimedia Comm., Oct. 27-30, 2002.
D. Singer et al., "A general mechanism for RTP Header Extensions," RFC 5285, IETF Internet Draft (Jul. 2008).
Fidler M, "Real-Time Multimedia Streams in a Differentiated Services Network," Computer Communications and Networks, 2001. Proceedings Tenth International Conference on Oct. 15-17, 2001, Piscataway, NJ, USA, IEEE, Oct. 15, 2001, pp. 380-385, XP010562121.
G.Cheung et al., "Video transport over wireless networks," IEEE Trans . Multimedia, Aug. 2005 , pp. 777-785.
H. Schulzrinne et al.,"RTP: A Transport Protocol for Real-Time Applications," IETF RFC 3550 (2003).
Hari Garudadri et al.: "Feedback Based Network Adaptive Source Coding for Packet Switched Multimedia Telephony," Qualcomm Inc.—PSVT: Feedback base rate control; version 0.6 May 26, Sep. 13, Sep. 19, 2006, pp. 1-9.
Harinath Garudadri et al.: "Rate Adaptation for Video Telephony in 3G Networks" Nov. 12-13, 2007, pp. 342-348.
He et al.: "A Linear Source Model and a Unified Rate Control Algorithm for DCT Video Coding", IEEE Transactions on Circuits and Systems for Video Technology, IEEE Service Center, Piscataway, NJ, US, vol. 12 No. 11, Nov. 2002, p. 970-982.
Hosein, et al.: "Dynamic Power Headroom Threshold for Mobile Rate Determination in a CDMA Network", Vehicular Technology Conference, 2004, VTC 2004-Spring, 2004 IEEE 59th Milan, Italy, May 17-19, 2004, Piscataway, NJ, USA, IEEE, May 17, 2004, pp. 2404-2408.
I. Johansson et al., "Support for non-compound RTCP in RTCP AVPF profile, opportunities and consequences," IETF Internet Draft Dec. 20, 2006; Expires Jun. 23, 2007.

International Search Report and Written Opinion—PCT/US2009/030668, International Search Authority—European Patent Office—May 18, 2009.
ISO/IEC 14496-2, International Standard, Information technology—Coding of audio-visual objects—Part 2: Visual, Third edition Jun. 1, 2004.
ITU-T H.264, Series H: Audiovisual and Multimedia System Infrastructure of audiovisual services, Coding of moving video, "Advanced video coding for generic audivisual services," Nov. 2007: 7.3.5.3 Residual Data Syntax; and 9.2 CALVLC parsing process.
"ITU-T Study Group 16, rate control for low-delay video communications," No. q15-A-20, 1997.
Kalavakunta R et al: "Evolution of mobile broadband access technologies and services consideration and solutions for smooth migration from 2G to 3G networks" Personal Wireless Communications, 2005. IICPWC 2005. 2005 IEEE International Conference on Jan. 23-25, 2005, pp. 144-149, xp010799046.
Kamel I et al.: "A Study on Scheduling Multiple Priority Requests in Multimedia Servers," Multimedia Computing and Systems, 1999. IEEE International Conference on Florance, Italy Jun. 7-11, 1999, Los Alamitos, CA, USA, IEEE comput. Soc., US, vol. 2, Jun./Jul. 1999, pp. 395-399, XP010519422.
Keller R et al.: "An Active Router Architecture for Multicast Video Distribution," Infocom 2000. Nineteenth Annual joint Conference of the IEEE Computer and Communications Societies. Proceedings IEEE Tel Aviv, Israel Mar. 26-30, 2000, Piscataway, NJ, USA, pp. 1137-1146.
Kikuchi Toshiba T Nomura Neg S Fukunaga Oki Y Matsui Matsushita H Kimata NTT Y: "RTP Payload Format for MPEG-4 Audio/Visual Streams" IETF Standard, Internet Engineering Task Force, IETF, CH, Nov. 2000, pp. 1-21, XP015008799 ISSN: 0000-0003.
Kueh V Y H et al.: "Performance evaluation of SIP-based session establishment over satellite-UMTS" VTC 2003-Spring. The 57th IEEE Semiannual Vehicular Technology Conference Proceedings. Apr. 22-25, 2003, vol. 2, Apr. 22, 2003, pp. 1381-1385, XP010862.
Lakshman T et al.: "The Drop from Front Strategy in TCP and in TCP over ATM," Proceedings of IEEE Infocom 1996. Conference on Computer Communications. Fifteenth Annual Joint Conference of the IEEE Computer and Communications Societies. Networking the Next Generation, Mar. 24-28, 1996, vol. 3, conf. 15, Mar. 24, 1996, pp. 1242-1250, XP000622260.
Lee M et al: "Video Frame Rate Control for Non-Guaranteed Network Services With Explicit Rate Feedback" IEEE Telecommunication Conference, Nov. 27-Dec. 1, 2000; vol. 1, Nov. 27, 2000, pp. 293-297, XP001195580.
Lei Z et al.: "Adaptive video transcoding and streaming over wireless channels" Journal of Systems & Software, vol. 75, No. 3, Mar. 1, 2005, pp. 253-270, XP004656968.
Lu, X; et. al: "Understanding video quality and its use in feedback control" Packet Video 2002, Pittsburgh,PA USA 2002.
Meng-Huang Lee et al.: A Predictable High-Throughput File System for Video Conference Recording Systems, Man and Cybernetics, 1995. Intelligent Sytmes for the 21st Century, IEEE International Conference on Vancouver, BC, Canada Oct. 22-25, 1995, New York, vol. 5, Oct. 22, 1995, pp. 4296-4301, XP010195015.
Myeong-Jin Lee et al.: "Video Frame Rate Control for Non-Guaranteed Network Services with Explicit Rate Feedback," Proceedings of Global Telecommunications Conference, pp. 293-297, 2000, XP002427548.
Ott Helsinki University of Technology S Wenger Nokia N Sato Oki C Burmeister J Rey Matsushita J: "Extended RTP Profile for Real-time Transport Control Protocol (RTCP)-Based Feedback (RTP/AVPF); rfc4585.txt" IETF Standard, Internet Engineering Task Force, IETF, CH, Jul. 1, 2006, XP015055018 ISSN: 0000-0003 abstract p. 31, paragraph 6-p. 41.
Reininger D et al.: "VBR MPEG Video Coding with Dynamic Bandwidth Renegotiation," Communications-Gateway to Globalization. Proceedings of the Conference on Communications. Seattle, Jun. 18-22, 1995, ICC, New York, IEEE, US, vol. 3, Jun. 18, 1995, pp. 1773-1777.
RFC 2190 C. Zhu et al.: "RTP Payload Format for H.263 Video Streams," Network Working Group, pp. 1-12, Sep. 1997.

(56) References Cited

OTHER PUBLICATIONS

RFC 2429 C, Borman et al.: "RTP Payload Format for the 1998 Version of ITU-T Rec. H.263 Video (H.263+)," Network Working Group, pp. 1-17, Oct. 1998.
Ruiz, P. et el.: "Adaptive Multimedia Applications to Improve User-perceived QoS in Multihop Wireless AI hoc Networks," Proceedings of the IEEE Int-rnation-1 Conference on Wireless Lane and Horne Networks (1CWLHN 2002) Online] Aug. 2002, pp. 673-684, XP002466712.
Technical Specification Group Radio Access Network: "3GPP TR25.848 V4.0.0 Physical Layer Aspects of UTRA High Speed Downlink Packet Access (Release 4)" 3GPP TR 25.848 V4.0.0, Mar. 2001, pp. 1-89, XP002189517.
Text Description of Joint Model Reference Encoding Methods and Decoding Concealment Methods, Joint Video Team (JVT) of ISO/IEC MPEG and ITU-T VCEG Hong Kong, Jan. 2005. Sections 2.1.2.1.2, 2.1.3.1.1, 2.5, 3.1, 3.3.
"TIA/EIA/IS-856 CDMA2000 High Rate Packet Data Air Interface Specification," Apr. 2004.
T.V. Lakshman et al.: "Transporting compressed video over ATM networks with explicit-rate feedback control," IEEE Trans. Networking, Oct. 1999, vol. 7, No. 5, pp. 710-723.
T.V. Lakshman et al.: "VBR Video: Tradeoffs and Potentials", Proceeding of the IEEE, May 1998, vol. 86, No. 5, pp. 952-973.
"Universal Mobile Telecommunications System (UMTS); Radio Link Control (RLC) Protocol Specification (3GPP TS 25.322 version 6.9.0 Release 6); ETSI TS 125.322" ETSI Standards, LIS, vol. 3-R2, No. v6.9.0, Sep. 1, 2006, XP014035577.
"Video Codec Test Model, Near-Term Version 8 (TMN8) Revision 1," ITU-T Telecommunication Standardization Sector of ITU, Geneva, CH, vol. Q15/16, Sep. 8, 1997, pp. I-III, 1, XP001074663.
Y.-G. Kim et al.: "TCP-frendly internet video with smooth and fast rate adaption and networks-aware error control," IEEE Trans. Circ. Sys. Vid. Tech., Feb. 2004, vol. 14, No. 2, pp. 256-268.
Zhihai He et al., "Optimum Bit Allocation and Accurate Rate Control for Video Coding via p-Domain Source Modeling," IEEE Transactions on Circuits and Systems for Video Technology, vol. 12, No. 10, Oct. 2002, p. 840-849.
Kang, K. et al.: "Dynamic Rate Control Mechanism for Large Scale Sessions," Twelfth International Conference on Information Networking Proceedings, 1998. (ICOIN-12). Tokyo, Japan, Jan. 21-23, 1998, pp. 21-24, XP010265270, ISBN: 978-0-8186-7225-5., doi: 10.1109/ICOIN.1998.648346.
Khansari, M. et al.: "Low Bit-Rate Video Transmission over Fading Channels for Wireless Microcellular Systems," IEEE Transactions on Circuits and Systems for Video Technology, IEEE Service Center, Piscataway, NJ, US, vol. 6, No. 1, (Jan. 2, 1996), XP011014283, ISSN: 1051-8215.
Stockhammer, Thomas. "Progressive Video Transmission For Packet Lossy Channels Exploiting Feedback and Unequal Erasure Protection," International Conference on Image Processing (ICIP), vol. 2, (Sep. 22, 2002), pp. 169-172, XP010607935, ISBN: 978-0-7803-7622-9.
Translation of Korean Application 2008-7029470 corresponding to U.S. Appl. No. 11/445,099, citing KR2005-45667 (KR pub KR20060046281) dated Apr. 30, 2010.
Translation of Office Action in Chinese application 200680046647.1 corresponding to U.S. Appl. No. 11/454,475, citing US20030012212 and CN1293871 dated Mar. 17, 2011.
Translation of Office Action in Chinese Application 200680046657.5 corresponding to U.S. Appl. No. 11/315,399, citing US20030152032, CN1272271, WO2004056028, EP1170957 and EP1168732 dated Mar. 16, 2011.
Translation of Office Action in Japan application 2008-533677 corresponding to U.S. Appl. No. 11/240,133, citing JP10164533, JP10322673, JP2004072720, JP2004364277, JP2005236783, JP2004350227, US5541919 and US5341374 dated Feb. 1, 2011.
3GPP S4-060613 "MTSI Dynamic Video Rate Adaptation", Nov. 2006, pp. 1-6.
3GPP TS 26.234 v7.1.0 (Dec. 2006), 3rd Generation Partnership Project; Technical Specification Group Services and System Aspects; Transparent end-to-end Packet-switched Streaming Service (PSS); Protocols and codecs (Release 7) pp. 35-39, 41-42, and 49-52.
"Simulation Results for MTSI Dynamic Video Adaptation Signalling", 3GPP TSG-SA WG4 #42 S4-070056, Jan. 29, 2007, pp. 1-12.
Qun-Hua, Wang et al., "The Application of a Simple TCP-friendly Congestion/Rate Control Arithmetic on Multimedia Teaching System", Computer and Information Technology, Apr. 30, 2007, pp. 28-30, vol. 15 No. 2.
Taiwan Search Report—TW098100863—TIPO—Feb. 11, 2013.
Translation of Office Action in Chinese Application No. 200980101850.8, corresponding to U.S. Appl. No. 12/331,234, citing Qun-Hua, Wang et al., "The Application of a Simple TCP-friendly Congestion/Rate Control Arithmetic on Multimedia Teaching System", Computer and Information Technology, Apr. 30, 2007, pp. 28-30, vol. 15 No. 2, dated Jan. 28, 2013.
ITU-T H.263 "Series H: Audiovisual and Multimedia Systems Infrastructure of audiovisual service-Coding of moving video: Video coding for low bitrate communication," (Jan. 2005), 226 pages.

\* cited by examiner

SYSTEM AND METHOD TO ADAPT TO NETWORK CONGESTION

CLAIM OF PRIORITY UNDER 35 U.S.C. §119

The present Application for Patent claims priority to Provisional Application No. 61/020,368 entitled "METHOD AND APPARATUS FOR ADAPTING RATE-TRAJECTORY TO NETWORK CONGESTION" filed Jan. 10, 2008 and assigned to the assignee hereof and hereby expressly incorporated by reference herein.

RELATED APPLICATION

The present application relates to U.S. application Ser. No. 11/315,399, filed on Dec. 21, 2005, entitled "Methods and Systems for Adaptive Encoding of Real-Time Information in Packet-Switched Wireless Communication Devices", and U.S. application Ser. No. 11/972,594, filed on Jan. 10, 2008, entitled "Content- and Link-Dependent Coding Adaptation for Multimedia Telephony", and assigned to the assignee hereof, and expressly incorporated by reference herein.

FIELD OF THE DISCLOSURE

The present disclosure is generally directed to systems and methods to adapt to network congestion.

BACKGROUND

When a sending terminal in a network detects congestion or easing of congestion in the network, the sending terminal may determine how to adapt the transmission rate of data sent from the sending terminal. The problem of determining what transmission rate to choose based on feedback received from a receiver in the network may be challenging. Proper selection of the adaptation rate may improve the convergence of the adaptation control loop and may improve the quality of service. However, frequently oscillating rate adjustments towards convergence may degrade the service experience, particularly for real-time services. Another challenge of rate adaptation is to determine how quickly to increase the transmission rate when congestion has eased. Increasing the rate too aggressively may quickly introduce further congestion if the sender is unaware of the channel condition, which may lead to a poor service experience because of the increase of the transmission rate followed by the sudden need to decrease the transmission rate due to the further congestion. Increasing the rate too conservatively may prevent the sender from making full use of the decongested channel as the decongested channel develops additional capacity.

Conventional approaches typically adapt to feedback by changing the send rate to a fixed value until another feedback message is received and the congestion status information is updated, involving multiple feedback messages. Such conventional approaches do not attempt to adapt to network congestion based on a single feedback message. During congestion, achieving a multi-phase adaptation of decongestion followed by transmission at the maximum sustainable rate requires multiple feedback messages from the receiver describing the status of the channel. During easing of congestion, the sender conventionally uses very conservative increases in rate along with waiting for feedback to ensure that the sender does not re-introduce congestion. Also, when congestion has eased, conventional approaches typically blindly probe the channel with additional data to get an estimate of the maximum sustainable rate of the channel. The blind probing may introduce additional delay if the blind probing re-introduces congestion and the channel is unable to transport the additionally inserted data in a timely manner.

SUMMARY

In a particular embodiment, a method is disclosed that includes receiving a feedback message at a transmitter, the feedback message including an indication of a magnitude of congestion and a sustainable rate of data transmission at a receiver. The method also includes determining a decongestion rate and a decongestion time based on at least one of the sustainable rate of data transmission and the magnitude of congestion when the magnitude of congestion satisfies a threshold value. The method further includes sending data at the decongestion rate from the transmitter to the receiver for the decongestion time. The method also includes adjusting a data transmission rate at the transmitter to the sustainable rate of data transmission after the decongestion time is ended. In a particular embodiment, the sustainable rate of data transmission may be an estimated or predicted maximum sustainable rate.

In another embodiment, a method is disclosed that includes identifying congestion in a transmission path between a sender and a receiver using parameters provided in a feedback message from the receiver to the sender, the parameters including a magnitude of congestion and a sustainable rate of data transmission. The method also includes determining a decongestion rate and a decongestion time based on at least one of the sustainable rate of data transmission and the magnitude of congestion. The method further includes decongesting the transmission path by sending data at the decongestion rate from the sender to the receiver for the decongestion time. The method also includes adjusting a data transmission rate in the transmission path to the sustainable rate of data transmission after the decongestion time is ended.

In another embodiment, a method is disclosed that includes receiving a measured arrival-to-playout time offset (APTO) value and an average received rate (ARR) in a feedback message at a transmitter. The method also includes increasing a sending rate at the transmitter to an increased sending rate determined based on at least one of the APTO value and the ARR. The method further includes continuing transmission at the increased sending rate after a detection time, wherein the detection time is determined based on at least one of the APTO value and the ARR.

In another embodiment, a computer-readable medium including computer executable instructions is disclosed. The computer executable instructions are operable to cause a computer to send a feedback message from a receiver to a transmitter, the feedback message including a measured arrival-to-playout time offset (APTO) value and an average received rate (ARR). The computer executable instructions are operable to cause a computer to receive data at the receiver sent by the transmitter at a decongestion rate determined based on at least one of the APTO value and the ARR for a decongestion time determined based on at least one of the APTO value and the ARR. The computer executable instructions are operable to cause a computer to receive data at the receiver sent by the transmitter at a sustained data rate of the ARR after the decongestion time is ended. In alternative embodiments, the decongestion time may be set as a fixed constant T_decongest that is determined based on how quickly the service/user experience requires that decongestion be achieved. For example, the service requirement may be that decongestion be achieved within about 1000 milliseconds to avoid too much disruption to a video stream. In other alternative embodiments, the decongestion time may be set adaptively based on other measurements or criteria aside from the APTO value received.

In another embodiment, a method is disclosed that includes sending a feedback message from a receiver to a transmitter, the feedback message including a measured arrival-to-playout time offset (APTO) value and an average received rate (ARR). The method also includes receiving data at the receiver sent by the transmitter at a decongestion rate determined based on at least one of the APTO value and the ARR for a decongestion time determined based on at least one of the APTO value and the ARR. The method further includes receiving data at the receiver sent by the transmitter at the maximum sustained data rate of the ARR after the decongestion time is ended.

In another embodiment, an apparatus is disclosed that includes means for sending a feedback message from a receiver to a transmitter. The feedback message includes a measured arrival-to-playout time offset (APTO) value and an average received rate (ARR). The apparatus also includes means for receiving data at the receiver sent by the transmitter at a decongestion rate determined based on at least one of the APTO value and the ARR for a decongestion time determined based on at least one of the APTO value and the ARR. The apparatus further includes means for receiving data at the receiver sent by the transmitter at the maximum sustained data rate of the ARR after the decongestion time is ended.

In another embodiment, an apparatus is disclosed that includes a processor configured to generate a feedback message to send from a receiver to a transmitter. The feedback message includes a measured arrival-to-playout time offset (APTO) value and an average received rate (ARR). Data is received at the receiver sent by the transmitter at a decongestion rate determined based on at least one of the APTO value and the ARR for a decongestion time determined based on at least one of the APTO value and the ARR. Data is received at the receiver sent by the transmitter at the maximum sustained data rate of the ARR after the decongestion time is ended.

In another embodiment, an apparatus is disclosed that includes a transmitter configured to transmit data, to receive a measured arrival-to-playout time offset (APTO) value and an average received rate (ARR) in a feedback message, to initiate decongestion by reducing a sending rate at the transmitter to a decongestion rate determined based on at least one of the APTO value and the ARR, and to end decongestion transmission at the decongestion rate after a decongestion time determined based on at least one of the APTO value and the ARR.

In another embodiment, an apparatus is disclosed that includes means for initiating decongestion by reducing a sending rate at a transmitter to a decongestion rate determined based on at least one of a measured arrival-to-playout time offset (APTO) value and an average received rate (ARR) that are received in a feedback message. The apparatus also includes means for ending decongestion transmission at the decongestion rate after a decongestion time determined based on at least one of the APTO value and the ARR.

One particular advantage provided by the disclosed embodiments is that channel decongestion and then transmission at the maximum sustainable rate under congestion conditions may be achieved.

Another advantage provided by the disclosed embodiments is that a ramp-up of rate above the current transmission rate that does not reintroduce congestion under conditions of congestion easing may be achieved.

Other aspects, advantages, and features of the present disclosure will become apparent after review of the entire application, including the following sections: Brief Description of the Drawings, Detailed Description, and the Claims.

DETAILED DESCRIPTION

Figure 1:
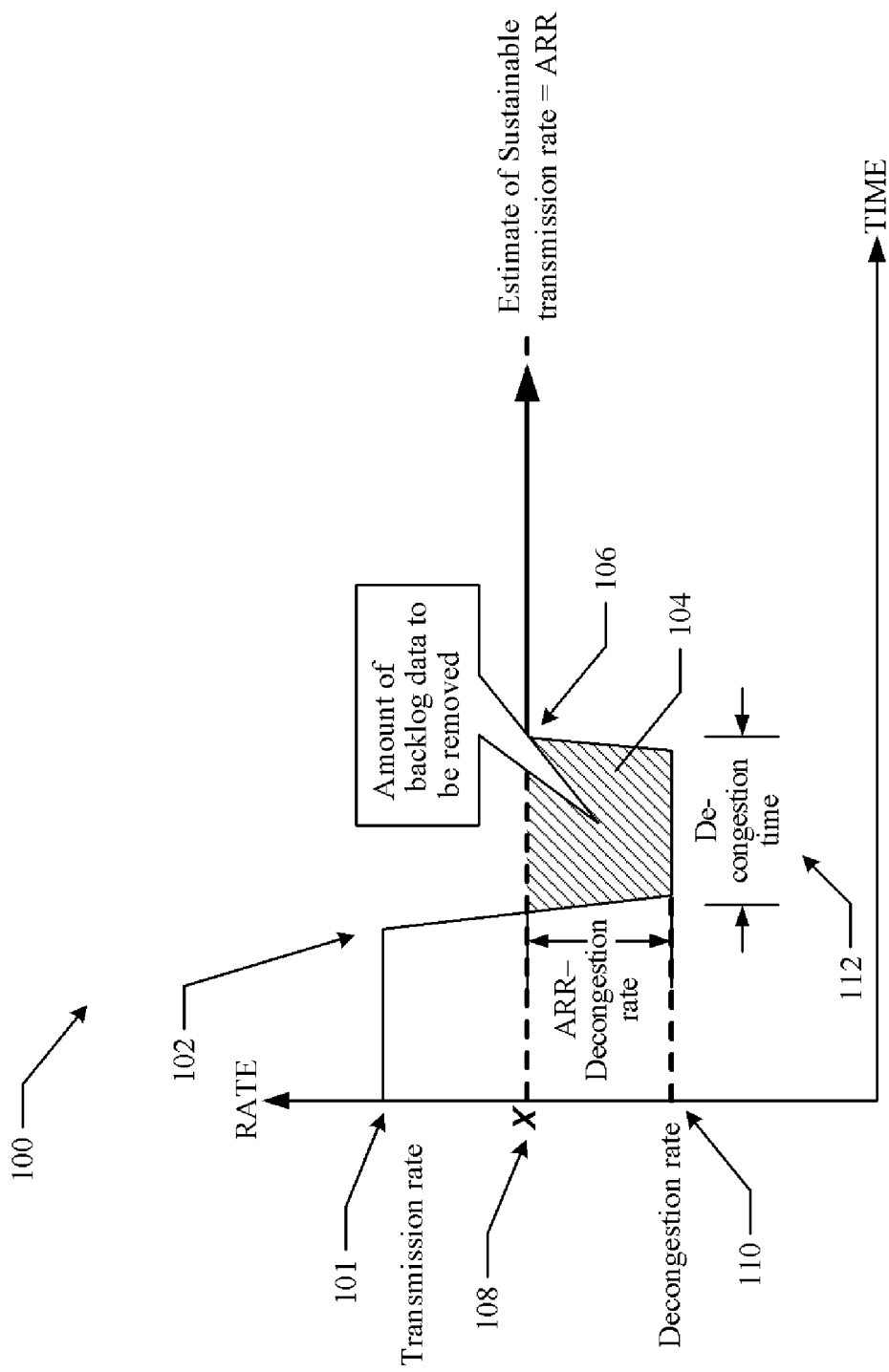
FIG. 1 is a diagram of a particular illustrative embodiment of modifying a transmission rate to adapt to network congestion.

Referring to FIG. 1, a diagram of a particular illustrative embodiment of modifying a transmission rate to adapt to network congestion is depicted and generally designated 100. The diagram 100 depicts a transmission rate of a transmitter as a function of time. Initially, the transmitter sends data at a first transmission rate 101. A feedback message may be received at the transmitter, as indicated at 102. The feedback message includes an indication of a magnitude of congestion of a transmission network and a sustainable rate of data transmission 108 at a receiver that receives data from the transmitter. A decongestion rate 110 and a decongestion time 112 may be determined based on at least one of the sustainable rate of data transmission 108 and the magnitude of congestion when the magnitude of congestion satisfies a threshold value. After determining the magnitude of congestion and the sustainable rate of data transmission 108, data may be sent at the decongestion rate 110 from the transmitter to the receiver for the decongestion time 112, as indicated at 104. A data transmission rate at the transmitter may be adjusted to the sustainable rate of data transmission 108 after the decongestion time 112 is ended, as indicated at 106. In a particular embodiment, the transmitter transmits the data to the receiver via a wireless network. In a particular embodiment, the sustainable rate of data transmission may be substantially the maximum sustainable rate of data transmission. As used herein, the term maximum sustainable rate of data transmission is an estimated or predicted maximum sustainable rate of data transmission.

Including the magnitude of congestion and the maximum sustainable rate of data transmission enables the sender or transmitter to determine rate-trajectories based on a single feedback message. Either the sender or the transmitter may estimate the amount of congested bits in the transmission path. Based on this estimate and the estimate of the maximum sustainable rate of data transmission provided in the single feedback message, the sender or transmitter may determine a set of rates that may achieve channel decongestion and then transmission at the maximum sustainable rate under congestion conditions.

In a particular embodiment, the magnitude of congestion may be measured by an arrival-to-playout time offset (APTO) value and the maximum sustainable rate of data transmission 108 may be measured by an average received rate (ARR) of data received at the receiver. In a particular embodiment, congestion in an uplink, a downlink, and a core network may be reflected in a standardized APTO_ARR feedback message from the receiver to the sender or transmitter. The APTO_ARR is defined in the 3GPP2 C.P0055-A standard, and has been proposed for the 3GPP TS 26.114 standard. Information in the standardized APTO_ARR feedback message may indicate congestion at the receiver where data packets are not arriving at the receiver in time for properly scheduled playout. Information in the standardized APTO_ARR feedback message may also provide an estimate for guidance on what rate may be sustainable for the end-to-end transmission path. The standardized APTO_ARR feedback message may indicate the average received rate (ARR) at the receiver and also the receiver's request to advance or delay arrival times of data packets (APTO) based on playout needs. The delay may serve as an outer loop variable of a real-time packet (RTP) service.

In a particular embodiment, sending the data from the transmitter to the receiver at the decongestion rate 110 for the decongestion time 112 may remove an amount of congested data, the amount of congested data removed being substantially equal to a product of the decongestion time 112 and a difference between the ARR 108 and the decongestion rate 110, as shown in FIG. 1. In a particular embodiment, the amount of congested data removed may also be equal to a product of the APTO value and the ARR 108. In a particular embodiment, during congestion the sender or transmitter rate adapts down to enable the data packets to arrive at the receiver in time for playout, initially by removing the backlog caused by congestion and then by operating at the maximum sustainable rate of the system that does not introduce further congestion or another backlog. If the backlog is not removed initially, then just operating at the maximum sustainable rate may not correct the current congestion state and the data packets may still be delayed. In a particular embodiment, during easing of congestion the sender or transmitter rate adapts up to improve the quality of the data transmission while ensuring that data packets arrive at the receiver in time for proper playout, improving the quality of the data transmission. When the data packets are from a video encoder, the resulting video quality may be thereby improved, for example.

Figure 2:
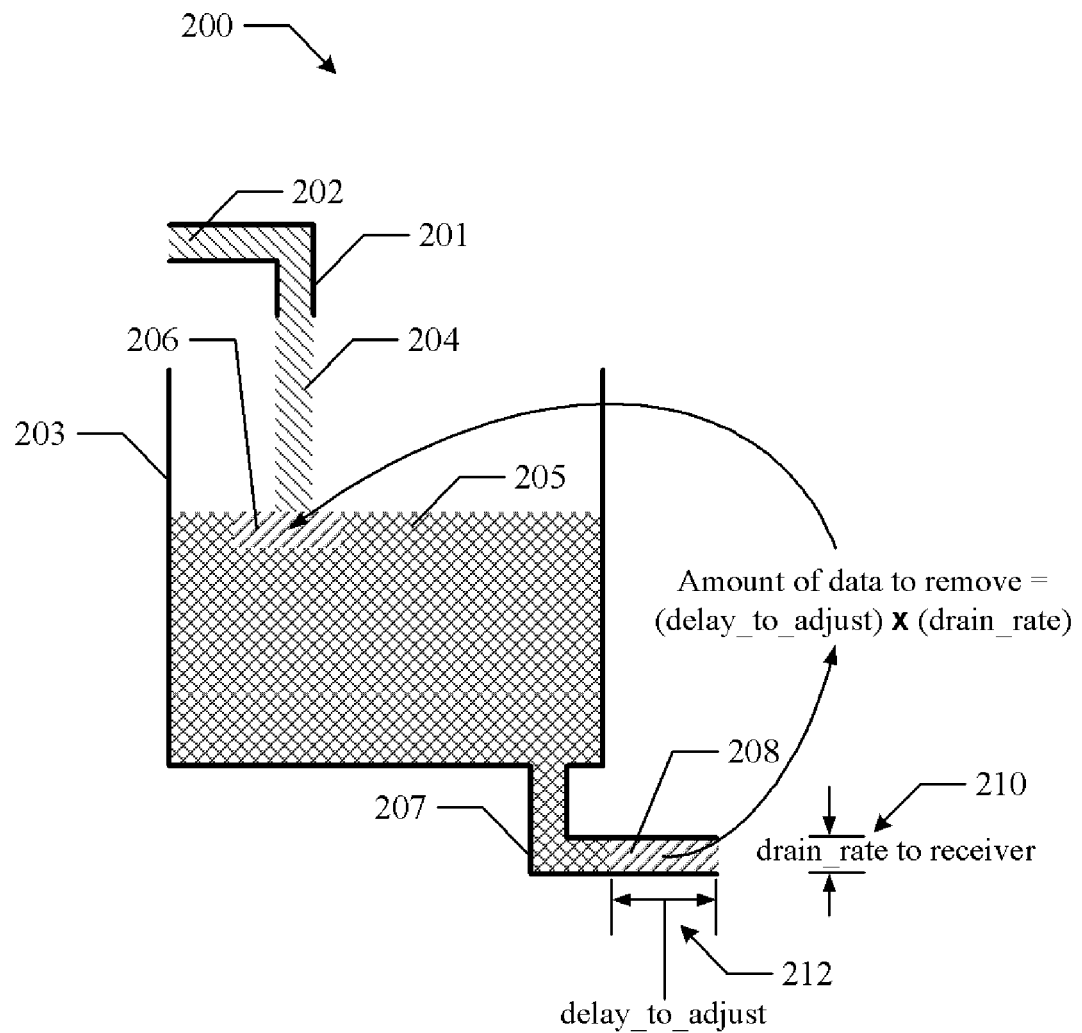
FIG. 2 is a diagram of a particular illustrative embodiment of a fluid model of network congestion to determine an amount of congested data to remove from a network.

Referring to FIG. 2, a diagram of a particular illustrative embodiment of a fluid model of network congestion to determine an amount of congested data to remove from a network is depicted and generally designated 200. A spout 201 directs a data packet stream 202 into a bucket 203. An amount of data 205 accumulates in the bucket 203 before being drained out of the bucket 203 through a drain 207. When the inflow of the data through the spout 201 equals the outflow of the data through the drain 207, the amount of data 205 in the bucket 203 remains constant. When the inflow of the data through the spout 201 is greater than the outflow of the data through the drain 207, the amount of the data 205 accumulating in the bucket 203 increases, indicating a state of congestion in the data transmission path. When the inflow of the data through the spout 201 is less than the outflow of the data through the drain 207, the amount of the data 205 accumulating in the bucket 203 decreases, which decongests the data transmission path.

Data packets from a video encoder may enter the data packet stream, as indicated at 202. An amount of congested data to remove 208 may be equal to the product of a delay_to_adjust time 212 and a drain_rate 210 to the receiver. In a particular embodiment, the delay_to_adjust time 212 may be equal to the APTO value and the drain_rate 210 may be equal to the ARR 108 of FIG. 1. The encoder rate of data transmission may be reduced to the decongestion rate 110 for the decongestion time 112 to remove an amount of data 206 from the bucket 203, where the amount of data 206 removed from the bucket 203 may be equal to the amount of congested data to remove 208. Once the backlog of the amount of data 206 has been removed, data packets 204 arriving after the decongestion time 112 may leave the bucket 203 at the proper playout time. In a particular embodiment, the ARR 108 may serve as an estimate of the drain_rate 210 of the bucket and the sender or transmitter may remove a number of octets of congested data from the bucket 203 equal to the product of the APTO value and the ARR 108. As described above, when the inflow of the data through the spout 201 (the encoder rate of data transmission) is less than the outflow of the data through the drain 207 (the drain_rate 210), the amount of the data 205 accumulating in the bucket 203 decreases, which decongests the data transmission path. The ARR 108 may also serve as an estimate of the maximum sustainable rate through the system and may be used to transmit at the maximum sustainable rate of the ARR 108 once congestion is removed. In a particular embodiment, the ARR 108 may be measured for media throughput, real-time packet (RTP) throughput, which allows a video encoder, for example, to use the ARR 108 for a rate control target rate.

Figure 3:
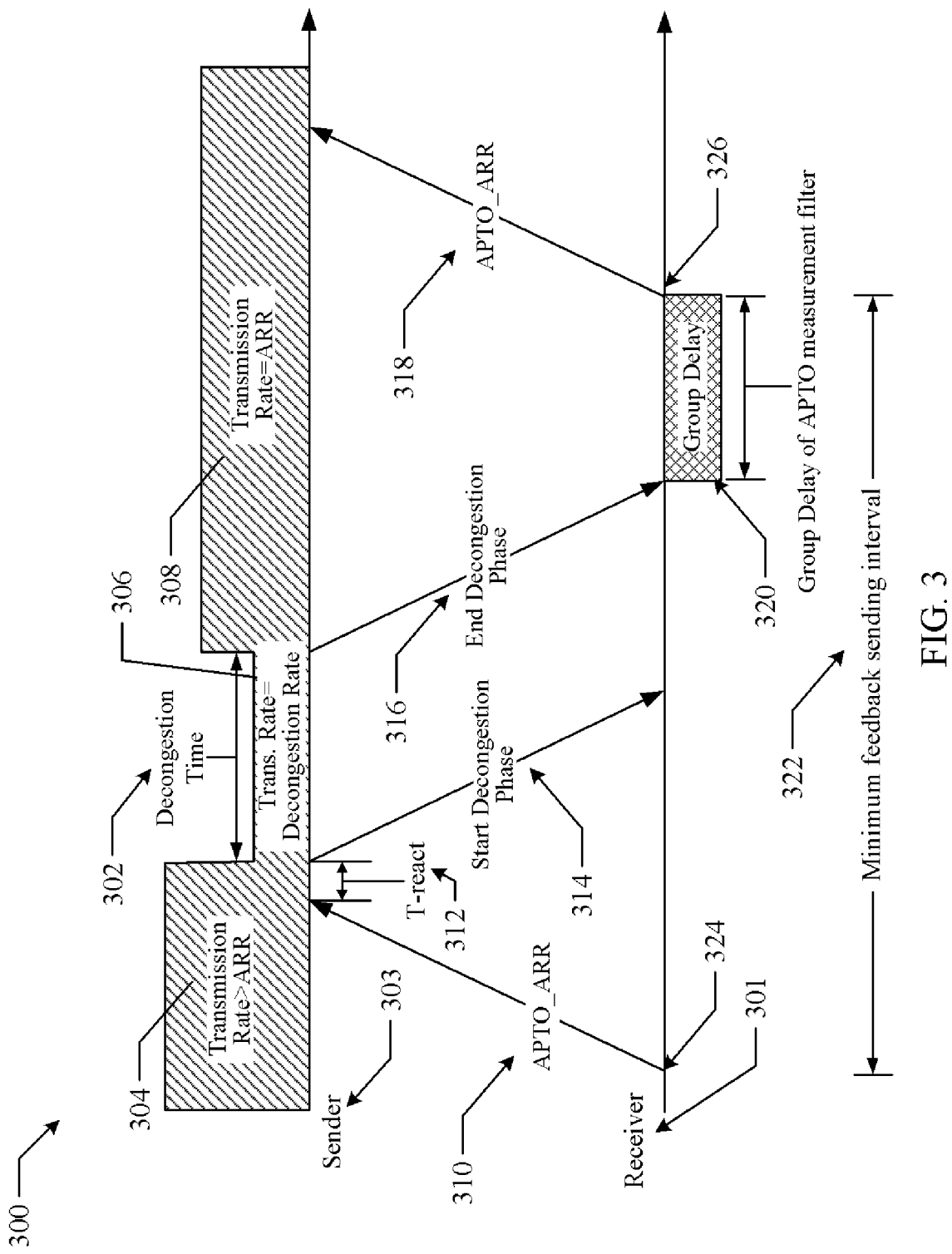
FIG. 3 is a timing diagram of a particular illustrative embodiment of adapting a transmission rate to network congestion to decongest the transmission path.

Referring to FIG. 3, a diagram of a particular illustrative embodiment of a method to adapt to network congestion by showing how fast to decongest a transmission path is depicted and generally designated 300. In a particular embodiment, the diagram 300 illustrates timing associated with decongestion according to FIG. 1. Initially, as indicated at 304, a transmission rate may be greater than the ARR 108. The receiver 301 may measure an unacceptable APTO value, as indicated at 324, and send an APTO_ARR feedback message 310 to the sender or transmitter 303. The APTO_ARR feedback message 310 may be received at the sender or transmitter 303, which may take a time T_react to react to the APTO_ARR feedback message 310, as indicated at 312. The sender or transmitter 303 may react to the APTO_ARR feedback message 310 by reducing the transmission rate to the decongestion rate 110, as indicated at 306, for the decongestion time 112, as indicated at 302. The start of the decongestion phase propagates to the receiver 301, as indicated at 314, and the end of the decongestion phase propagates to the receiver 301, as indicated at 316. After the decongestion time 112 has ended, the transmission rate is increased to the ARR 108, as indicated at 308. A group delay of the APTO measurement filter is indicated at 320. A minimum feedback sending interval is indicated at 322. Finally, as indicated at 326, the receiver 301 checks the APTO measurement to determine whether another APTO_ARR feedback message 318 needs to be sent to the sender or transmitter 303.

In a particular embodiment, the channel may be decongested before the receiver 301 makes the next decision about the state of congestion. In a particular embodiment, the transmission path may be decongested as fast as possible to quickly ease congestion at the receiver 301. However, very aggressive decongestion requires reducing the data transmission to a much lower decongestion rate 110, which may unacceptably degrade video performance during the decongestion phase when the data packets contain encoded video data. In a particular embodiment, the decongestion rate 110 may be at least equal to a rate to achieve an acceptable frame quality and an acceptable frame rate. The rate to achieve an acceptable frame quality and an acceptable frame rate may be a rate that produces video frames that maintain an acceptable peak signal-to-noise ratio (PSNR), because otherwise the video frame may be skipped in accord with a variable frame rate (VFR). In another particular embodiment, the decongestion rate 110 may be at least equal to a rate to achieve a minimum frame quality and a minimum frame rate. The rate to achieve a minimum frame quality and a minimum frame rate may be a rate that produces video frames that maintain a minimum peak signal-to-noise ratio (PSNR), because otherwise the video frame may be skipped in accord with a variable frame rate (VFR).

In a particular embodiment, the decongestion time 112 may be proportional to the APTO value with a constant of proportionality F. The decongestion time 112 may also be proportional to the amount or magnitude of congestion. The decongestion rate 110 may be proportional to the ARR 108 with a constant of proportionality equal to a ratio of (F−1) to F. For video data, the decongestion rate 110 may be achieved by encoding each frame at a target rate of the ARR 108 and then skipping every Fth frame. For example, when F equals two, the decongestion time 112 may be twice the APTO value and the decongestion rate 110 may be half the ARR 108. For video data, the video encoder may skip sending every other frame encoded at the target rate of the ARR 108 for a time period of twice the APTO value.

In alternative embodiments, the decongestion time may be set as a fixed constant T_decongest that is determined based on how quickly the service/user experience requires that decongestion be achieved. For example, the service requirement may be that decongestion be achieved within about 1000 milliseconds to avoid too much disruption to a video stream. The decongestion rate may then be equal to the product of the ARR with (1−APTO/T_decongest). In other alternative embodiments, the decongestion time may be set adaptively to T_decongest_adapt based on other measurements or criteria aside from the APTO value received. For example, the measurements or criteria may include quality of service considerations, total network usage, the number of users, the amount of usage per user, and the like. The decongestion rate may then be equal to the product of the ARR with (1−APTO/T_decongest_adapt).

Figure 4:
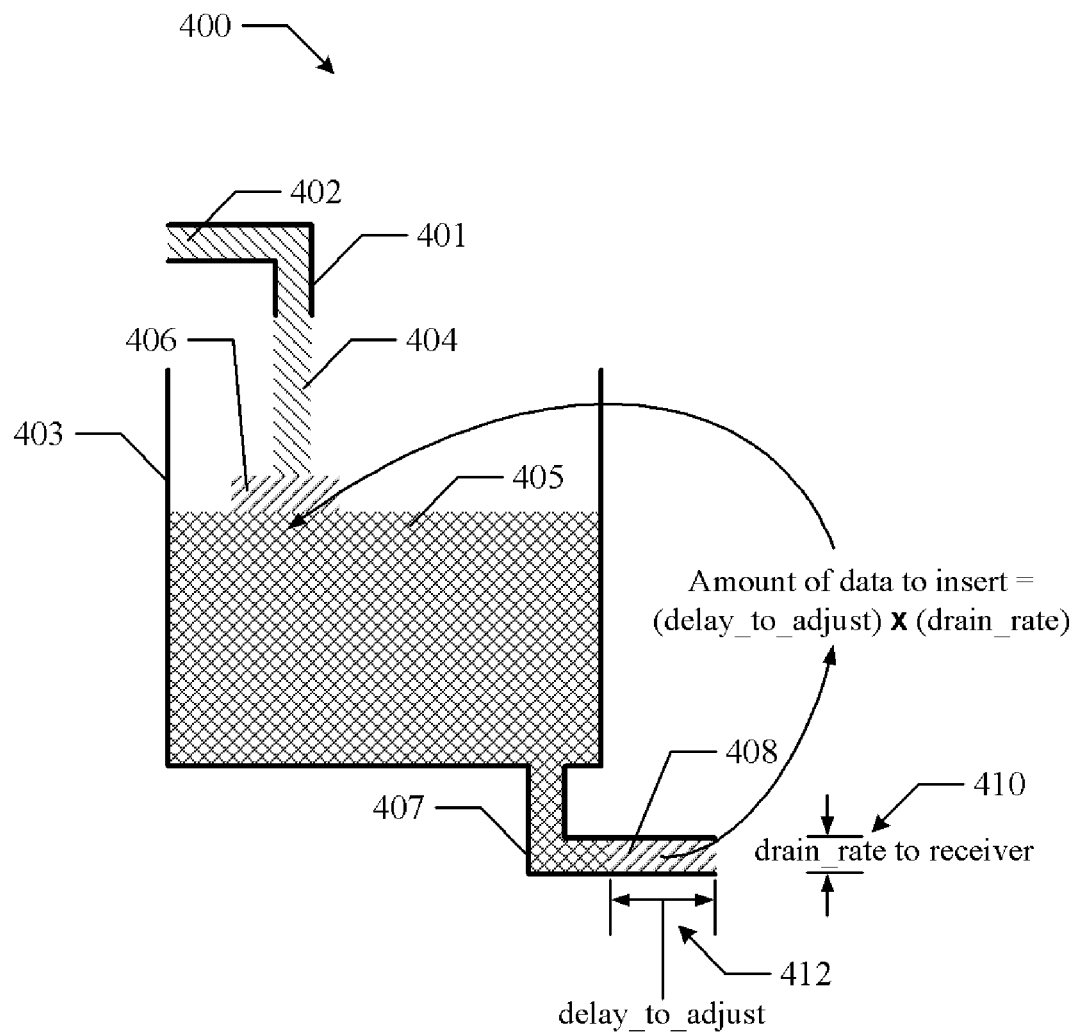
FIG. 4 is a diagram of a particular illustrative embodiment of using a fluid model of congestion to determine an amount of data to insert into a network.

Referring to FIG. 4, a diagram of a particular illustrative embodiment of a method to adapt to network decongestion/easing of congestion using the fluid model of congestion is depicted and generally designated 400. A spout 401 directs a data packet stream 402 into a bucket 403. An amount of data 405 accumulates in the bucket 403 before being drained out of the bucket 403 through a drain 407. When the inflow of the data through the spout 401 equals the outflow of the data through the drain 407, the amount of data 405 in the bucket 403 remains constant. When the inflow of the data through the spout 401 is greater than the outflow of the data through the drain 407, the amount of the data 405 accumulating in the bucket 403 increases, indicating a state of congestion in the data transmission path. When the inflow of the data through the spout 401 is less than the outflow of the data through the drain 407, the amount of the data 405 accumulating in the bucket 403 decreases, indicating that there is room to insert additional data into the data packet stream 402 without increasing the congestion of the system.

Data packets from a video encoder may enter the data packet stream, as indicated at 402. An amount of insertable data to insert 408 may be equal to the product of a delay_to_adjust time 412 and a drain_rate 410 to the receiver. As described above, when the inflow of the data through the spout 401 is less than the outflow of the data through the drain 407, the amount of the data 405 accumulating in the bucket 403 decreases, indicating that there is room to insert additional data into the data packet stream 402 without causing additional congestion. In a particular embodiment, the delay_to_adjust time 412 may be equal to the absolute value of the APTO value and the drain_rate 410 may be greater than or at least equal to the ARR 108. The encoder rate of data transmission may be increased to another rate of sending data long enough to insert an amount of data 406 into the bucket 403, where the amount of data 406 inserted into the bucket 403 may be equal to the amount of insertable data to insert 408. Once the amount of data 406 has been inserted, data packets 404 arriving after the insertion phase may leave the bucket 403 at the proper playout time. In a particular embodiment, the transmission rate of the transmitter may be increased to a rate higher than a current rate of data transmission when the magnitude of congestion is less than a threshold value. In a particular embodiment, the transmission rate of the transmitter may be increased to a rate higher than the ARR 108 when the APTO value is less than a threshold value.

In a particular embodiment, the APTO value indicates a difference in the arrival statistic of data packets at the receiver compared to when the data packets are scheduled for proper playout without jitter, for video data. The APTO value may be an indication of the amount of delay the receiver would like to adjust in the end-to-end transmission path between the video sender and receiver. If there is congestion, then the APTO value may be positive and backlog packets in the bucket may be drained by the APTO value to remove the delay, as shown in FIG. 2. If there is an easing of congestion, then the APTO value may be negative and the encoder may increase the transmission rate to use the additional bandwidth, where an amount of delay may be introduced that is equal to the absolute value of the APTO value, as shown in FIG. 4.

Figure 5:
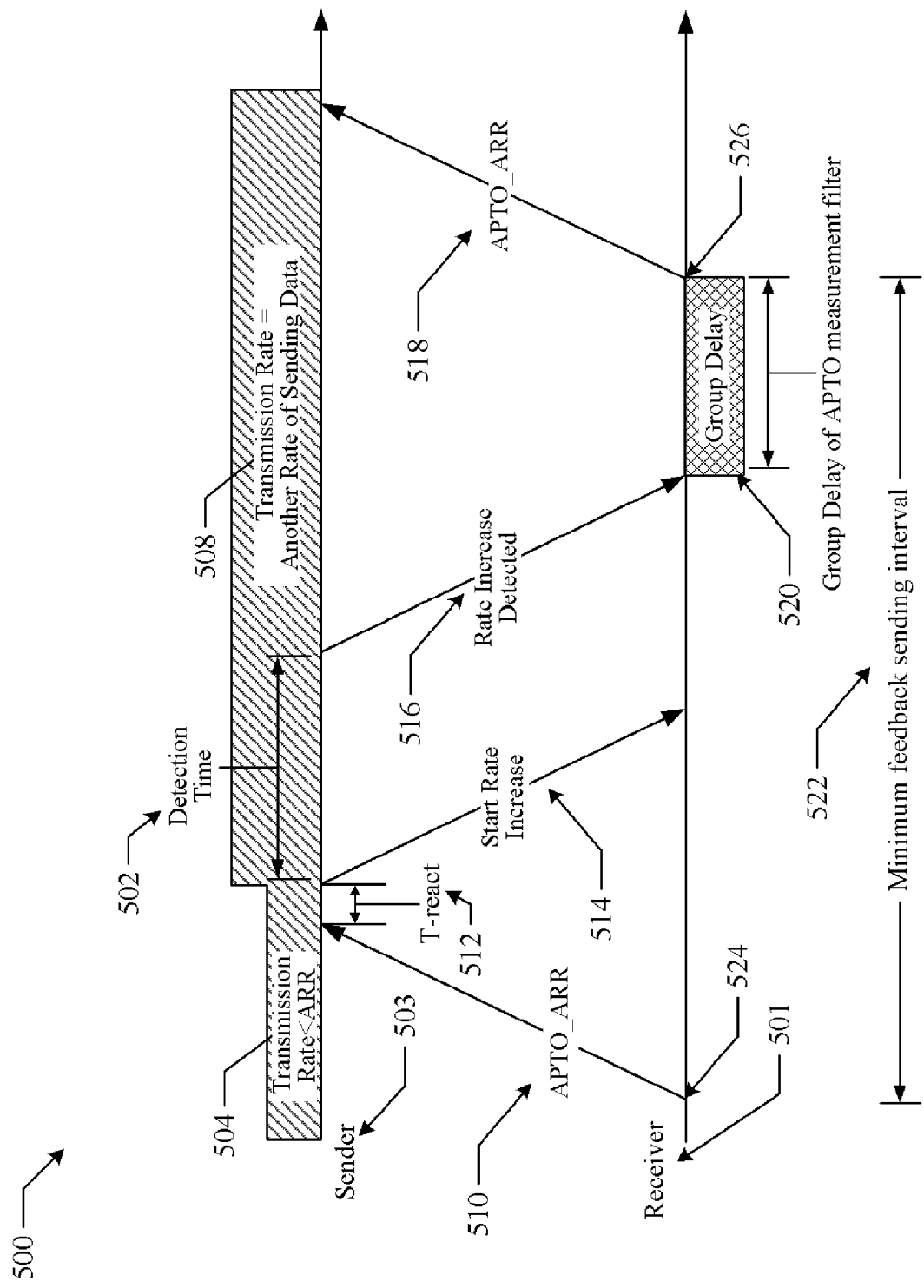
FIG. 5 is a timing diagram of a particular illustrative embodiment of adapting a transmission rate to network congestion to ramp-up data transmission.

Referring to FIG. 5, a diagram of a particular illustrative embodiment of a method to adapt to network congestion by showing how fast to ramp-up data transmission is depicted and generally designated 500. Initially, as indicated at 504, a transmission rate may be less than the ARR 108. In another embodiment, the transmission rate may not be less than the ARR 108. The receiver 501 may measure an APTO value that is less than a threshold value, as indicated at 524, and send an APTO_ARR feedback message 510 to the sender or transmitter 503. The APTO_ARR feedback message 510 may be received at the sender or transmitter 503, which may take a time T_react to react to the APTO_ARR feedback message 510, as indicated at 512. The sender or transmitter 503 may react to the APTO_ARR feedback message 510 by increasing the transmission rate to another rate of sending data, as indicated at 508, for at least a detection time, as indicated at 502. The start of the rate increase propagates to the receiver 501, as indicated at 514, and the end of the detection time, when the rate increase is detected at the receiver 501, propagates to the receiver 501, as indicated at 516. A group delay of the APTO measurement filter is indicated at 520. A minimum feedback sending interval is indicated at 522. Finally, as indicated at 526, the receiver 501 checks the APTO measurement to determine whether another APTO_ARR feedback message 518 needs to be sent to the sender or transmitter 503.

Figure 6:
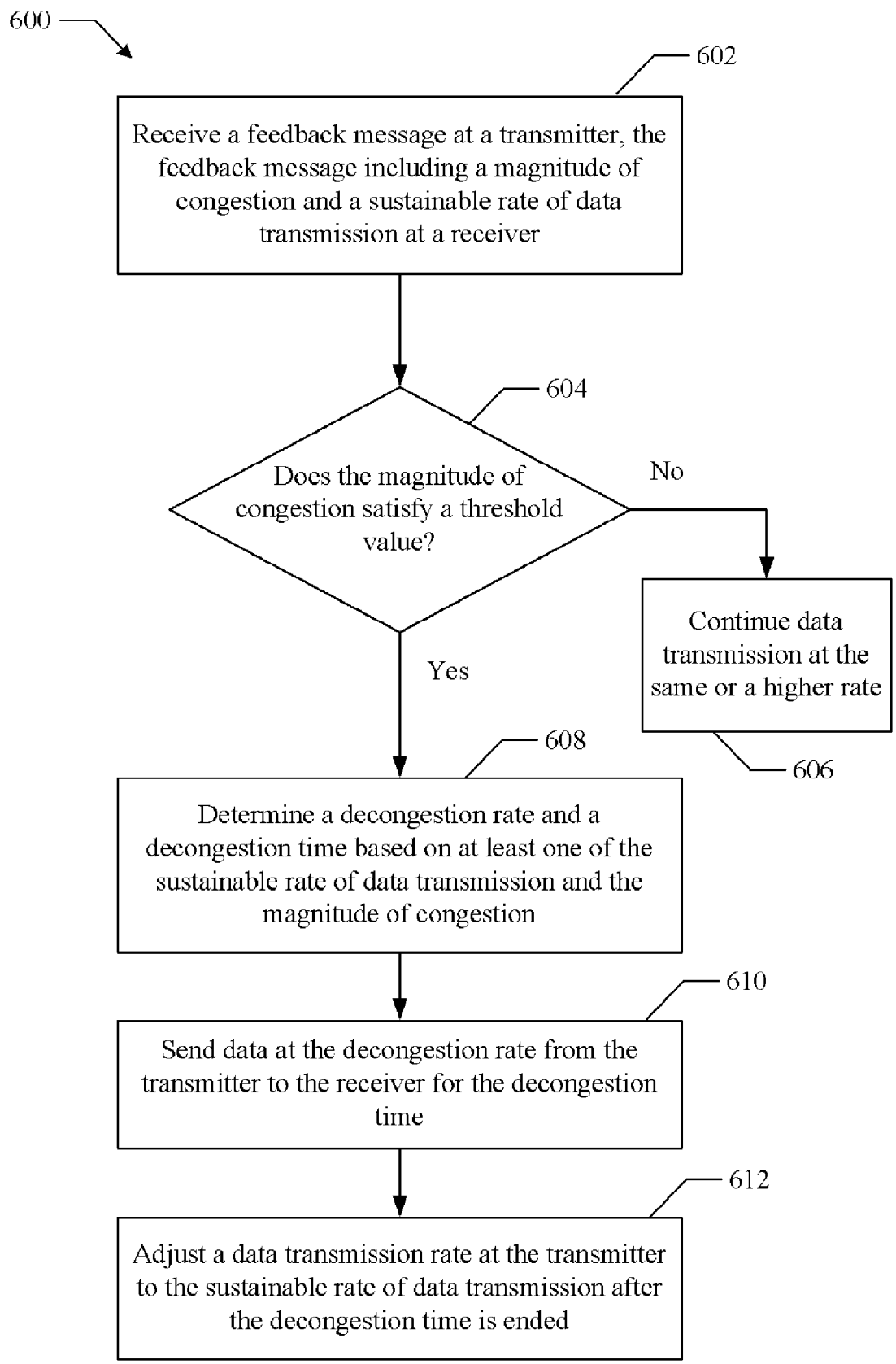
FIG. 6 is a flow diagram of a first illustrative embodiment of a method to adapt to network congestion.

In a particular embodiment, for the sake of convenience, the detection time may be set to be equal to the decongestion time 112. In a particular embodiment, the detection time may be equal to the decongestion time 112 and may also be proportional to the absolute value of the last received APTO value with a constant of proportionality F. In a particular embodiment, another rate of sending data may be determined to accomplish an addition of insertable data into the network that may be distributed over a time period that is proportional to the decongestion time 112 with a constant of proportionality R. In a particular embodiment, another rate of sending data may be equal to the product of the ARR 108 and the sum of one and the reciprocal of the product of R and F. In another particular embodiment, another rate of sending data may be equal to the product of the sender's current transmission rate and the sum of one and the reciprocal of the product of R and F. In other particular embodiments, the detection time may be a constant, or the detection time may be set adaptively. The detection time may therefore be determined based on at least one of the APTO value, the ARR, a constant value, or an adaptively set value Referring to FIG. 6, a flow diagram of a particular illustrative embodiment of a method to adapt to network congestion is depicted and generally designated 600. The method 600 includes receiving a feedback message at a transmitter, the feedback message including a magnitude of congestion and a sustainable rate of data transmission at a receiver, as indicated at 602. For example, the APTO_ARR feedback message 310 may be received at a transmitter, the APTO_ARR feedback message 310 including a magnitude of congestion, the APTO value, and the sustainable rate of data transmission, the ARR 108, as depicted in FIG. 1 and FIG. 3. The method 600 includes determining whether the magnitude of congestion satisfies a threshold value, as indicated at 604. For example, the APTO value may be positive, indicating congestion, and may be larger than a predetermined amount, indicating too much congestion. If the magnitude of congestion does not satisfy a threshold value, then the method 600 includes continuing data transmission at the same or a higher rate, as indicated at 606. For example, if the APTO is less than a threshold amount, then the transmission rate may be increased to another rate of sending data, as depicted in FIG. 5.

If the magnitude of congestion does satisfy the threshold value, then the method 600 includes determining a decongestion rate and a decongestion time based on at least one of the sustainable rate of data transmission and the magnitude of congestion, as indicated at 608. For example, the decongestion time 112 of FIG. 1 may be proportional to the APTO value with a constant of proportionality F, and the decongestion rate 110 may be proportional to the ARR 108 with a constant of proportionality equal to a ratio of (F−1) to F. The method 600 includes sending data at the decongestion rate from the transmitter to the receiver for the decongestion time, as indicated at 610. For example, data may be sent at the decongestion rate 110 from the transmitter to the receiver for the decongestion time 112, as depicted in FIG. 1 and FIG. 3. The method 600 also includes adjusting a data transmission rate at the transmitter to the sustainable rate of data transmission after the decongestion time is ended, as indicated at 612. For example, the data transmission rate at the transmitter may be adjusted to the ARR 108 after the decongestion time 112 is ended, as depicted in FIG. 1 and FIG. 3.

Figure 7:
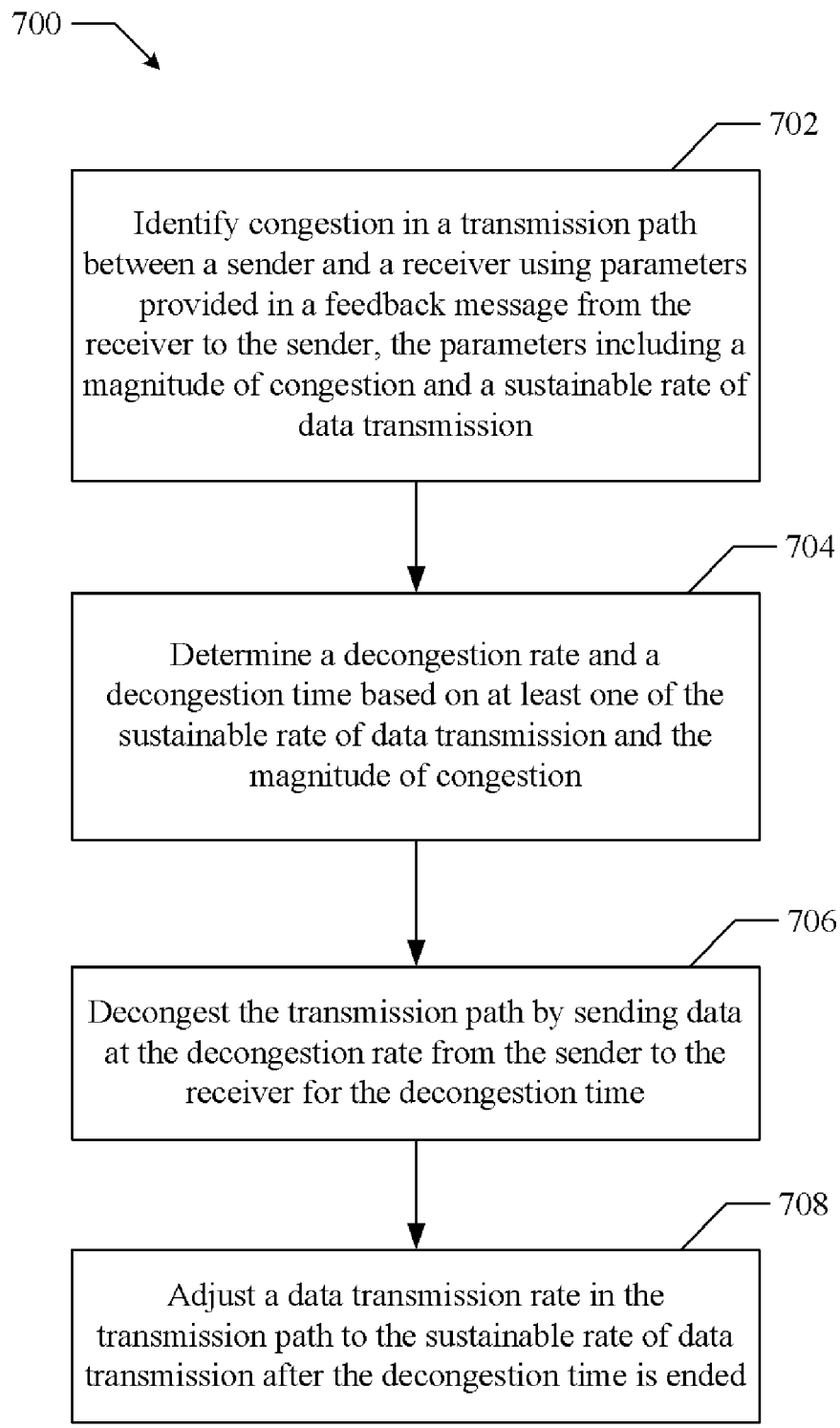
FIG. 7 is a flow diagram of a second illustrative embodiment of a method to adapt to network congestion.

Referring to FIG. 7, a flow diagram of another particular illustrative embodiment of a method to adapt to network congestion is depicted and generally designated 700. The method 700 includes identifying congestion in a transmission path between a sender and a receiver using parameters provided in a feedback message from the receiver to the sender, the parameters including a magnitude of congestion and a sustainable rate of data transmission, as indicated at 702. For example, the APTO_ARR feedback message 310 may be received at a transmitter, the APTO_ARR feedback message 310 including a magnitude of congestion, the APTO value, and the sustainable rate of data transmission, the ARR 108, as depicted in FIG. 1 and FIG. 3. The method 700 includes determining a decongestion rate and a decongestion time based on at least one of the sustainable rate of data transmission and the magnitude of congestion, as indicated at 704. For example, the decongestion time 112 may be proportional to the APTO value with a constant of proportionality F, and the decongestion rate 110 may be proportional to the ARR 108 with a constant of proportionality equal to a ratio of (F−1) to F. The method 700 includes decongesting the transmission path by sending data at the decongestion rate from the sender to the receiver for the decongestion time, as indicated at 706. For example, data may be sent at the decongestion rate 110 from the transmitter to the receiver for the decongestion time 112, as depicted in FIG. 1 and FIG. 3. The method 700 includes adjusting a data transmission rate in the transmission path to the sustainable rate of data transmission after the decongestion time is ended, as indicated at 708. For example, the data transmission rate at the transmitter may be adjusted to the ARR 108 after the decongestion time 112 is ended, as depicted in FIG. 1 and FIG. 3.

In a particular embodiment, the magnitude of congestion is an arrival-to-playout time offset (APTO) value measured at the receiver. In a particular embodiment, the sustainable rate of data transmission 108 is an average received rate (ARR) of data transmission of data received at the receiver, as shown in FIG. 1. In a particular embodiment, the sustainable rate of data transmission 108 is the maximum rate of data transmission that does not cause congestion of the transmission path. In a particular embodiment, decongesting the transmission path removes an amount of backlogged data, the amount of backlogged data being substantially equal to a product of the decongestion time 112 and a difference between the ARR 108 and the decongestion rate 110, as shown in FIGS. 1-3.

In a particular embodiment, the decongestion time 112 is proportional to the APTO value, with a constant of proportionality F, and the decongestion rate 110 is proportional to the ARR, with a constant of proportionality equal to a ratio of (F−1) to F. The method 700 may also include determining a quantity of insertable data that can be inserted into the transmission path before the transmission path starts to become congested, where insertion of the insertable data into the transmission path is distributed over a time period that is proportional to the decongestion time 112 with a constant of proportionality R. In a particular embodiment, another rate of sending data may be determined based on the ARR 108 and a product of R and F. In a particular embodiment, another rate of sending data may be equal to the product of the ARR 108 and the sum of one and the reciprocal of the product of R and F. In other particular embodiments, the period of inserting the insertable data may be a constant or may be set adaptively based on other parameters or criteria, such as quality of service considerations, total network usage, the number of users, the amount of usage per user, and the like.

Figure 8:
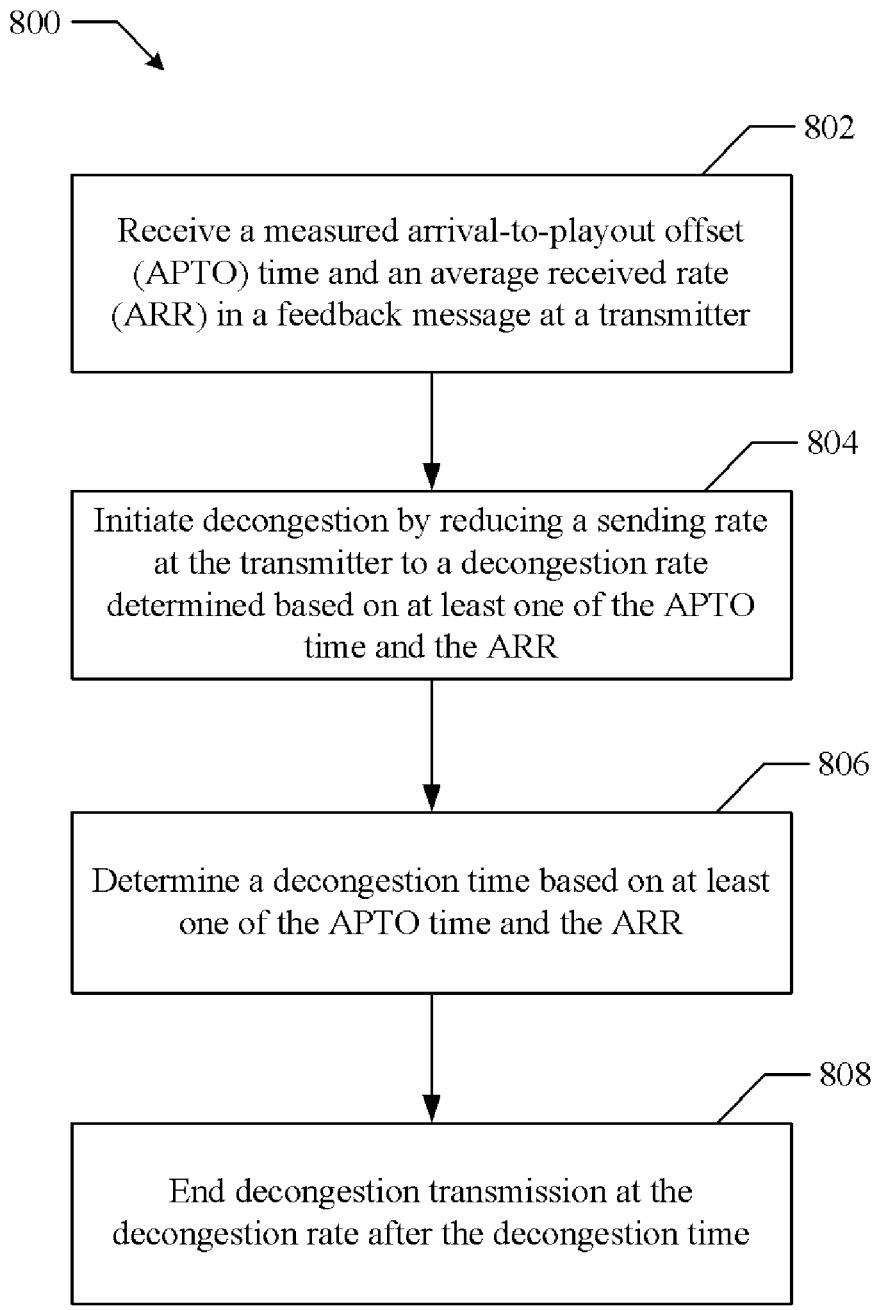
FIG. 8 is a flow diagram of a third illustrative embodiment of a method to adapt to network congestion.

Referring to FIG. 8, a flow diagram of yet another particular illustrative embodiment of a method to adapt to network congestion is depicted and generally designated 800. The method 800 includes receiving a measured arrival-to-playout time offset (APTO) value and an average received rate (ARR) in a feedback message at a transmitter, as indicated at 802. For example, the APTO_ARR feedback message 510 may be received at a transmitter, the APTO_ARR feedback message 510 including the APTO value and the ARR, as depicted in FIG. 5. The method 800 includes increasing a sending rate at the transmitter to an increased sending rate determined based on at least one of the APTO value and the ARR, as indicated at 804. For example, the sending rate at the transmitter may be increased to another rate 508, as shown in FIG. 5, and another rate 508 may be proportional to the ARR.

The method 800 includes determining a detection time based on at least one of the APTO value and the ARR, as indicated at 806. For example, the detection time 502 of FIG. 5 may be proportional to the absolute value of the APTO value with a constant of proportionality F. The method 800 includes continuing transmission at the increased sending rate after the detection time, as indicated at 808. For example, data may be sent at another rate 508 from the transmitter 503 to the receiver 501 after the detection time 502, as depicted in FIG. 5.

The method 800 may also include determining a quantity of insertable data that can be inserted into a transmission path before the transmission path starts to become congested, wherein insertion of the insertable data into the transmission path is distributed over a time period that is proportional to the detection time 502 of FIG. 5 with a constant of proportionality R. The method 800 may also include adding insertable data distributed over a data insertion time period that is proportional to the detection time 502 of FIG. 5 with a constant of proportionality R, where the detection time 502 is proportional to the absolute value of the APTO value with a constant of proportionality F, where the increased sending rate 508 is determined based on the ARR and a product of R and F. In a particular embodiment, the increased sending rate 508 of sending data may be equal to the product of the ARR and the sum of one and the reciprocal of the product of R and F. In another particular embodiment, the insertable data may be inserted over a fixed or constant detection time value.

Figure 9:
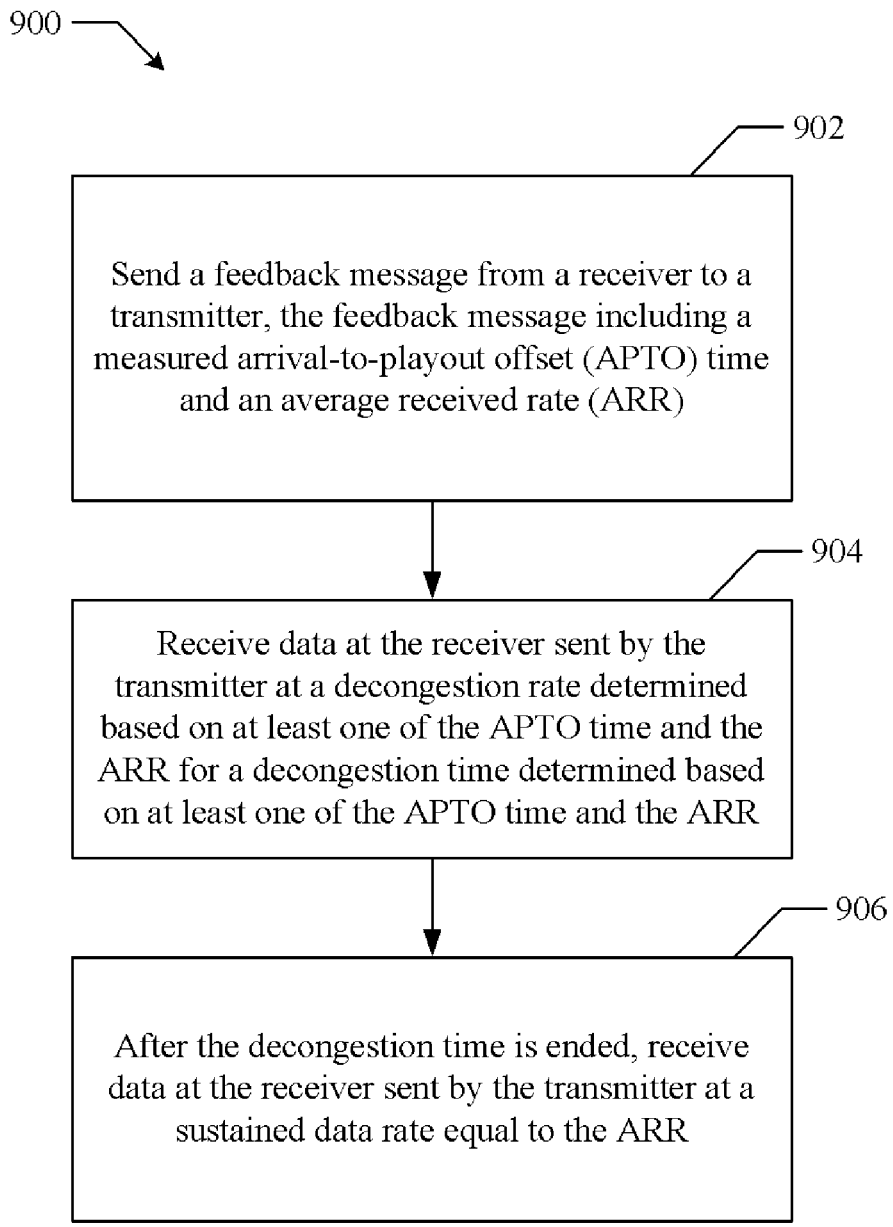
FIG. 9 is a flow diagram of a fourth illustrative embodiment of a method to adapt to network congestion.

Referring to FIG. 9, a flow diagram of still another particular illustrative embodiment of a method to adapt to network congestion is depicted and generally designated 900. The method 900 includes sending a feedback message from a receiver to a transmitter, the feedback message including a measured arrival-to-playout time offset (APTO) value and an average received rate (ARR), as indicated at 902. For example, the APTO_ARR feedback message 310 may be sent to a transmitter, the APTO_ARR feedback message 310 including the APTO value and the ARR 108, as depicted in FIG. 1 and FIG. 3.

The method 900 includes receiving data at the receiver sent by the transmitter at a decongestion rate determined based on at least one of the APTO value and the ARR for a decongestion time determined based on at least one of the APTO value and the ARR, as indicated at 904. For example, data may be received at the receiver sent by the transmitter at the decongestion rate 110 for the decongestion time 112, as depicted in FIG. 1 and FIG. 3. The decongestion time 112 may be proportional to the APTO value with a constant of proportionality F, and the decongestion rate 110 may be proportional to the ARR 108 with a constant of proportionality equal to a ratio of (F−1) to F. The method 900 includes, after the decongestion time is ended, receiving data at the receiver sent by the transmitter at a sustained data rate equal to the ARR, as indicated at 906. For example, the data transmission rate at the transmitter may be adjusted to the ARR 108 after the decongestion time 112 is ended, as depicted in FIG. 1 and FIG. 3.

In a particular embodiment, the decongestion time 112 is proportional to the APTO value with a constant of proportionality F, and the decongestion rate 110 is proportional to the ARR 108 with a constant of proportionality equal to a ratio of (F−1) to F. The method 900 may also include receiving additional inserted data at the receiver, the additional inserted data received during an insertion time period. In a particular embodiment, the insertion time period may be proportional to the decongestion time 112 with a constant of proportionality R. In other particular embodiments, the insertion time period may be constant or may be set adaptively based on other measurements or criteria, such as quality of service considerations, total network usage, the number of users, the amount of usage per user, and the like.

Figure 10:
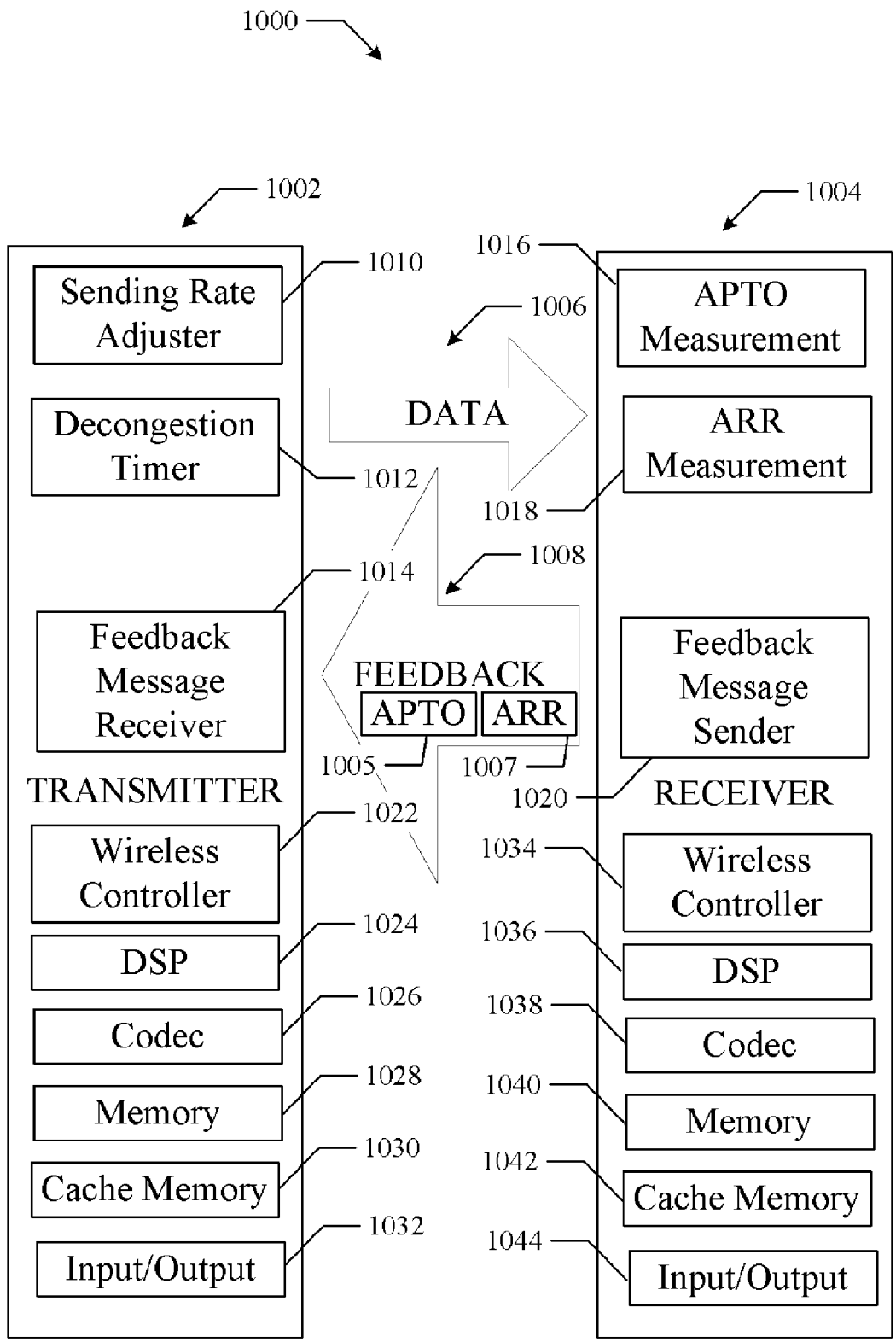
FIG. 10 is a diagram of a particular illustrative embodiment of a system that is adaptable to network congestion.

Referring to FIG. 10, a diagram of a particular illustrative embodiment of a system that is adaptable to network congestion is depicted and generally designated 1000. The system 1000 includes a transmitter 1002 configured to transmit data 1006. The system 1000 also includes means for receiving the data 1006, such as a receiver 1004 configured to receive the data 1006. The means for receiving may include a digital data receiver, a digital data packet receiver, a digital video data receiver, a digital video data packet receiver, a wireless data receiver, a wireless video data receiver, and the like. The transmitter 1002 is further configured to receive a measured arrival-to-playout time offset (APTO) value 1005 and an average received rate (ARR) 1007 in a feedback message 1008 from the receiver 1004, initiate decongestion by reducing a sending rate at the transmitter 1002 to a decongestion rate determined based on at least one of the APTO value 1005 and the ARR 1007, and end decongestion transmission at the decongestion rate after a decongestion time determined based on at least one of the APTO value 1005 and the ARR 1007. The APTO value 1005 may be measured at the receiver 1004 using an APTO measurement device 1016. The ARR 1007 may be measured at the receiver 1004 using an ARR measurement device 1018. The feedback message 1008 may be sent from the receiver 1004 using a feedback message sender 1020. The feedback message 1008 may be received at the transmitter 1002 using a feedback message receiver 1014. The sending rate at the transmitter 1002 may be reduced to the decongestion rate using a sending rate adjuster 1010. Ending the decongestion transmission at the decongestion rate after the decongestion time may be determined using a decongestion timer 1012.

In a particular embodiment, the decongestion time 112 of FIG. 1 may be proportional to the APTO value 1005 with a constant of proportionality F, and the decongestion rate 110 may be proportional to the ARR 1007 with a constant of proportionality equal to a ratio of (F−1) to F. In a particular embodiment, the transmitter 1002 may be further configured to receive the APTO value 1005 and the ARR 1007 in a single feedback message 1008 from the receiver 1004, where the transmitter 1002 is further configured to add insertable data distributed over an insertion time period that is proportional to the decongestion time 112 with a constant of proportionality R, and where another rate of sending data is determined based on the ARR 1007 and a product of R and F. In other particular embodiments, the insertion time period may be constant or may be set adaptively based on other measurements or criteria, such as quality of service considerations, total network usage, the number of users, the amount of usage per user, and the like.

The transmitter 1002 may include a memory 1028 and a cache memory 1030, which are coupled to a processor, such as a digital signal processor (DSP) 1024. The memory 1028 or the cache memory 1030 may include computer executable instructions that are operative to cause a computer, such as the digital signal processor 1024, to perform various operations. A coder/decoder (CODEC) 1026 may also be coupled to the digital signal processor 1024. A wireless controller 1022 may be coupled to the digital signal processor 1024 and to a wireless antenna (not shown). An input/output device 1032 may also be coupled to the digital signal processor 1024. The sending rate adjuster 1010 and the decongestion timer 1012 may be implemented in hardware, such as by dedicated circuitry, or may be executed by the digital signal processor 1024.

The receiver 1004 may include a memory 1040 and a cache memory 1042, which are coupled to a processor, such as a digital signal processor (DSP) 1036. The memory 1040 or the cache memory 1042 may include computer executable instructions that are operative to cause a computer, such as the digital signal processor 1036, to perform various operations, such as generating the feedback message 1008. A coder/decoder (CODEC) 1038 may also be coupled to the digital signal processor 1036. A wireless controller 1034 may be coupled to the digital signal processor 1036 and to a wireless antenna (not shown). An input/output device 1044 may also be coupled to the digital signal processor 1036. The APTO measurement device 1016 and the ARR measurement device 1018 may be implemented in hardware, such as by dedicated circuitry, or may be executed by the digital signal processor 1036.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may include instructions executed by a processor that reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disk read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

The invention claimed is:

1. A method comprising:
receiving a feedback message at a transmitter, the feedback message including an indication of a magnitude of congestion and a sustainable rate of data transmission at a receiver;
determining a decongestion rate and a decongestion time based on at least one of the sustainable rate of data transmission and the magnitude of congestion when the magnitude of congestion satisfies a threshold value;
sending data at the decongestion rate from the transmitter to the receiver for the decongestion time; and
adjusting a data transmission rate at the transmitter to the sustainable rate of data transmission after the decongestion time is ended;
wherein the magnitude of congestion is measured by an arrival-to-playout time offset (APTO) value and the sustainable rate of data transmission is measured by an average received rate (ARR) of data received at the receiver.

2. The method of claim 1, wherein sending the data from the transmitter to the receiver at the decongestion rate for the decongestion time removes an amount of congested data, the amount of congested data removed being substantially equal to a product of the decongestion time and a difference between the ARR and the decongestion rate.

3. The method of claim 1, wherein the decongestion time is proportional to the APTO value with a constant of proportionality F.

4. The method of claim 1, further comprising:
increasing the transmission rate of the transmitter to a rate higher than the sustainable rate of data transmission when the magnitude of congestion is less than the threshold value.

5. A method comprising:
identifying congestion in a transmission path between a sender and a receiver using parameters provided in a feedback message from the receiver to the sender, the parameters including a magnitude of congestion and a sustainable rate of data transmission;
determining a decongestion rate and a decongestion time based on at least one of the sustainable rate of data transmission and the magnitude of congestion;
decongesting the transmission path by sending data at the decongestion rate from the sender to the receiver for the decongestion time; and
adjusting a data transmission rate in the transmission path to the sustainable rate of data transmission after the decongestion time is ended;
wherein the magnitude of congestion is an arrival-to-playout time offset (APTO) value measured at the receiver; and
the sustainable rate of data transmission is an average received rate (ARR) of data transmission of data received at the receiver.

6. A method comprising:
receiving a measured arrival-to-playout time offset (APTO) value and an average received rate (ARR) in a feedback message at a transmitter;
increasing a sending rate at the transmitter to an increased sending rate determined based on at least one of the APTO value and the ARR; and continuing transmission at the increased sending rate after a detection time, wherein the detection time is determined based on at least one of the APTO value, the ARR, a constant value, or an adaptively set value.

7. The method of claim 6, further comprising:
determining a quantity of insertable data that can be inserted into a transmission path before the transmission path starts to become congested, wherein insertion of the insertable data into the transmission path is distributed over a time period that is proportional to the detection time with a constant of proportionality R.

8. The method of claim 6, further comprising:
adding insertable data distributed over a data insertion time period that is proportional to the detection time with a constant of proportionality R, wherein the detection time is proportional to the APTO value with a constant of proportionality F, wherein the increased sending rate is determined based on the ARR and a product of R and F.

9. A non-transitory computer-readable medium including computer executable instructions that are operative to cause the computer to:
send a feedback message from a receiver to a transmitter, the feedback message including a measured arrival-to-playout time offset (APTO) value and an average received rate (ARR);
receive data at the receiver sent by the transmitter at a decongestion rate determined based on at least one of the APTO value and the ARR for a decongestion time determined based on at least one of the APTO value and the ARR; and
receive data at the receiver sent by the transmitter at the maximum sustained data rate of the ARR after the decongestion time is ended.

10. The non-transitory computer-readable medium of claim 9, wherein the decongestion time is proportional to the APTO value with a constant of proportionality F, and the decongestion rate is proportional to the ARR with a constant of proportionality equal to a ratio of (F−1) to F.

11. The non-transitory computer-readable medium of claim 10, wherein the computer executable instructions are further operative to cause the computer to receive additional inserted data at the receiver, the additional inserted data received during an insertion time period.

12. A method comprising:
sending a feedback message from a receiver to a transmitter, the feedback message including a measured arrival-to-playout time offset (APTO) value and an average received rate (ARR);
receiving data at the receiver sent by the transmitter at a decongestion rate determined based on at least one of the APTO value and the ARR for a decongestion time determined based on at least one of the APTO value and the ARR; and
receiving data at the receiver sent by the transmitter at the maximum sustained data rate of the ARR after the decongestion time is ended.

13. The method of claim 12, wherein the decongestion time is proportional to the APTO value with a constant of proportionality F, and the decongestion rate is proportional to the ARR with a constant of proportionality equal to a ratio of (F−1) to F.

14. An apparatus comprising:
means for sending a feedback message from a receiver to a transmitter, the feedback message including a measured arrival-to-playout time offset (APTO) value and an average received rate (ARR);
means for receiving data at the receiver sent by the transmitter at a decongestion rate determined based on at least one of the APTO value and the ARR for a decongestion time determined based on at least one of the APTO value and the ARR; and
means for receiving data at the receiver sent by the transmitter at the maximum sustained data rate of the ARR after the decongestion time is ended.

15. The apparatus of claim 14, wherein the decongestion time is proportional to the APTO value with a constant of proportionality F, and the decongestion rate is proportional to the ARR with a constant of proportionality equal to a ratio of (F−1) to F.

16. An apparatus comprising:
a processor configured to generate a feedback message to send from a receiver to a transmitter, the feedback message including a measured arrival-to-playout time offset (APTO) value and an average received rate (ARR);
wherein data is received at the receiver sent by the transmitter at a decongestion rate determined based on at least one of the APTO value and the ARR for a decongestion time determined based on at least one of the APTO value and the ARR; and
wherein data is received at the receiver sent by the transmitter at the maximum sustained data rate of the ARR after the decongestion time is ended.

17. The apparatus of claim 16, wherein the decongestion time is proportional to the APTO value with a constant of proportionality F, and the decongestion rate is proportional to the ARR with a constant of proportionality equal to a ratio of (F−1) to F.

18. An apparatus comprising:
a transmitter configured to transmit data, to receive a measured arrival-to-playout time offset (APTO) value and an average received rate (ARR) in a feedback message, to initiate decongestion by reducing a sending rate at the transmitter to a decongestion rate determined based on at least one of the APTO value and the ARR, and to end decongestion transmission at the decongestion rate after a decongestion time determined based on at least one of the APTO value and the ARR.

19. The apparatus of claim 18, wherein the decongestion time is proportional to the APTO value with a constant of proportionality F, and the decongestion rate is proportional to the ARR with a constant of proportionality equal to a ratio of (F−1) to F.

20. The apparatus of claim 19, wherein the transmitter is further configured to receive the APTO value and the ARR in a single feedback message, wherein the transmitter is further configured to add insertable data distributed over an insertion time period that is proportional to the decongestion time with a constant of proportionality R, and wherein another rate of sending data is determined based on the ARR and a product of R and F.

21. An apparatus comprising:
means for initiating decongestion by reducing a sending rate at a transmitter to a decongestion rate determined based on at least one of a measured arrival-to-playout time offset (APTO) value and an average received rate (ARR) that are received in a feedback message; and
means for ending decongestion transmission at the decongestion rate after a decongestion time determined based on at least one of the APTO value and the ARR.

22. The apparatus of claim 21, wherein the decongestion time is proportional to the APTO value with a constant of proportionality F, and the decongestion rate is proportional to the ARR with a constant of proportionality equal to a ratio of (F−1) to F.

23. An apparatus comprising:
means for receiving a feedback message at a transmitter, the feedback message including an indication of a magnitude of congestion and a sustainable rate of data transmission at a receiver;
means for determining a decongestion rate and a decongestion time based on at least one of the sustainable rate of data transmission and the magnitude of congestion when the magnitude of congestion satisfies a threshold value;
means for sending data at the decongestion rate from the transmitter to the receiver for the decongestion time; and
means for adjusting a data transmission rate at the transmitter to the sustainable rate of data transmission after the decongestion time is ended, wherein the magnitude of congestion is an arrival-to-playout time offset (APTO) value measured at the receiver and the sustainable rate of data transmission is an average received rate (ARR) of data transmission of data received at the receiver.

24. A non-transitory computer-readable medium including computer executable instructions that are operative to cause the computer to:
receive a feedback message at a transmitter, the feedback message including an indication of a magnitude of congestion and a sustainable rate of data transmission at a receiver;
determine a decongestion rate and a decongestion time based on at least one of the sustainable rate of data transmission and the magnitude of congestion when the magnitude of congestion satisfies a threshold value;
send data at the decongestion rate from the transmitter to the receiver for the decongestion time; and
adjust a data transmission rate at the transmitter to the sustainable rate of data transmission after the decongestion time is ended, wherein the magnitude of congestion is an arrival-to-playout time offset (APTO) value measured at the receiver and the sustainable rate of data transmission is an average received rate (ARR) of data transmission of data received at the receiver.

25. An apparatus comprising:
a feedback message receiver configured to receive a feedback message at a transmitter, the feedback message including an indication of a magnitude of congestion and a sustainable rate of data transmission at a receiver; and
a processor configured to:
determine a decongestion rate and a decongestion time based on at least one of the sustainable rate of data transmission and the magnitude of congestion when the magnitude of congestion satisfies a threshold value;
send data at the decongestion rate from the transmitter to the receiver for the decongestion time; and
adjust a data transmission rate at the transmitter to the sustainable rate of data transmission after the decongestion time is ended, wherein the magnitude of congestion is an arrival-to-playout time offset (APTO) value measured at the receiver and the sustainable rate of data transmission is an average received rate (ARR) of data transmission of data received at the receiver.

26. An apparatus comprising:
means for identifying congestion in a transmission path between a sender and a receiver using parameters provided in a feedback message from the receiver to the sender, the parameters including a magnitude of congestion and a sustainable rate of data transmission;
means for determining a decongestion rate and a decongestion time based on at least one of the sustainable rate of data transmission and the magnitude of congestion;
means for decongesting the transmission path by sending data at the decongestion rate from the sender to the receiver for the decongestion time; and
means for adjusting a data transmission rate in the transmission path to the sustainable rate of data transmission after the decongestion time is ended, wherein the magnitude of congestion is an arrival-to-playout time offset (APTO) value measured at the receiver and the sustainable rate of data transmission is an average received rate (ARR) of data transmission of data received at the receiver.

27. A non-transitory computer-readable medium including computer executable instructions that are operative to cause the computer to:
identify congestion in a transmission path between a sender and a receiver using parameters provided in a feedback message from the receiver to the sender, the parameters including a magnitude of congestion and a sustainable rate of data transmission;
determine a decongestion rate and a decongestion time based on at least one of the sustainable rate of data transmission and the magnitude of congestion;
decongest the transmission path by sending data at the decongestion rate from the sender to the receiver for the decongestion time; and
adjust a data transmission rate in the transmission path to the sustainable rate of data transmission after the decongestion time is ended, wherein the magnitude of congestion is an arrival-to-playout time offset (APTO) value measured at the receiver and the sustainable rate of data transmission is an average received rate (ARR) of data transmission of data received at the receiver.

28. An apparatus comprising:
a processor configured to:
identify congestion in a transmission path between a sender and a receiver using parameters provided in a feedback message from the receiver to the sender, the parameters including a magnitude of congestion and a sustainable rate of data transmission;
determine a decongestion rate and a decongestion time based on at least one of the sustainable rate of data transmission and the magnitude of congestion;
decongest the transmission path by sending data at the decongestion rate from the sender to the receiver for the decongestion time; and
adjust a data transmission rate in the transmission path to the sustainable rate of data transmission after the decongestion time is ended, wherein the magnitude of congestion is an arrival-to-playout time offset (APTO) value measured at the receiver and the sustainable rate of data transmission is an average received rate (ARR) of data transmission of data received at the receiver.

29. A non-transitory computer-readable medium including computer executable instructions that are operative to cause the computer to:

receive a measured arrival-to-playout time offset (APTO) value and an average received rate (ARR) in a feedback message at a transmitter;

increase a sending rate at the transmitter to an increased sending rate determined based on at least one of the APTO value and the ARR; and continue transmission at the increased sending rate after a detection time, wherein the detection time is determined based on at least one of the APTO value, the ARR, a constant value, or an adaptively set value.

* * * * *